(12) United States Patent
Kanehara et al.

(10) Patent No.: US 10,006,433 B2
(45) Date of Patent: Jun. 26, 2018

(54) LASER IGNITION DEVICE

(71) Applicants: DENSO CORPORATION, Kariya, Aichi-pref. (JP); MITSUBISHI HEAVY INDUSTRIES, LTD., Tokyo (JP)

(72) Inventors: Kenji Kanehara, Nishio (JP); Naoki Kido, Nishio (JP); Akimitsu Sugiura, Kariya (JP); Nobuyuki Taguchi, Kariya (JP); Ryu Suzuki, Tokyo (JP); Akihiro Yuuki, Tokyo (JP); Minoru Ichihara, Tokyo (JP); Tomohiro Noguchi, Tokyo (JP)

(73) Assignees: DENSO CORPORATION, Kariya (JP); MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days. days.

(21) Appl. No.: 15/500,659

(22) PCT Filed: Jul. 27, 2015

(86) PCT No.: PCT/JP2015/071192
§ 371 (c)(1),
(2) Date: Jan. 31, 2017

(87) PCT Pub. No.: WO2016/017564
PCT Pub. Date: Feb. 4, 2016

(65) Prior Publication Data
US 2017/0218913 A1    Aug. 3, 2017

(30) Foreign Application Priority Data
Jul. 31, 2014 (JP) .................................. 2014-156005

(51) Int. Cl.
*F02P 23/04* (2006.01)
*F02B 19/10* (2006.01)

(52) U.S. Cl.
CPC .......... *F02P 23/04* (2013.01); *F02B 19/1095* (2013.01)

(58) Field of Classification Search
CPC ....... F02P 23/04; F02P 13/00; F02B 19/1061; F02B 19/1095; F02B 19/12; F02B 19/02;
(Continued)

(56) References Cited

U.S. PATENT DOCUMENTS 5,947,076 A     9/1999   Srinivasan et al.
2009/0159031 A1 6/2009   Gruber
(Continued)

FOREIGN PATENT DOCUMENTS

DE    10 2011 083 143    3/2013
EP        2 292 922       3/2011
(Continued)

OTHER PUBLICATIONS

English translation of International Search Report dated Oct. 27, 2015, issued in corresponding JP Application No. PCT/JP2015/071192 (2 pages).

*Primary Examiner* — Lindsay Low
*Assistant Examiner* — George Jin
(74) *Attorney, Agent, or Firm* — Nixon & Vanderhye P.C.

(57) ABSTRACT

In a laser ignition device which is mounted in an internal combustion engine and at least includes a laser spark plug equipped with an optical window which protects an optical device from high temperature and high pressure generated in a combustion chamber and a prechamber cap equipped with a cylindrical prechamber, a prechamber throat portion that is a bottomed cylinder with a sectional area smaller than that of the prechamber, and a plurality of prechamber spray holes (Continued)

which communicate with a combustion chamber on a side of a closed end of the prechamber throat portion, the prechamber cap is arranged between the optical window and the combustion chamber. A converging point FP is located inside the prechamber to ignite an air-fuel mixture delivered into the prechamber, thereby jetting combustion flames from the prechamber into the combustion chamber to fire the internal combustion engine. The center axis $AX_F$ of the prechamber is oriented horizontally eccentrically from the center axis $AX_S$ of the prechamber throat portion.

12 Claims, 16 Drawing Sheets

(58) Field of Classification Search
CPC .. F02B 19/10; F02B 19/1014; F02B 19/1023; Y02T 10/125
See application file for complete search history.

(56) References Cited

U.S. PATENT DOCUMENTS

| | | |
|---|---|---|
| 2011/0120404 A1 | 5/2011 | Weinrotter et al. |
| 2011/0259292 A1 | 10/2011 | Woerner et al. |
| 2011/0308489 A1* | 12/2011 | Herden ............... F02B 19/12 123/143 B |
| 2012/0248964 A1 | 10/2012 | Thomas et al. |
| 2012/0279469 A1 | 11/2012 | Weinrotter et al. |
| 2012/0304959 A1* | 12/2012 | Weinrotter ............ F02B 19/12 123/260 |
| 2013/0000597 A1* | 1/2013 | Weinrotter ............ F02B 19/12 123/253 |
| 2013/0025549 A1 | 1/2013 | Weinrotter et al. |
| 2013/0104827 A1 | 5/2013 | Woerner et al. |
| 2013/0133602 A1 | 5/2013 | Woerner et al. |
| 2013/0206091 A1 | 8/2013 | Kanehara et al. |
| 2014/0130761 A1 | 5/2014 | Woerner et al. |
| 2014/0165945 A1 | 6/2014 | Woerner et al. |
| 2014/0251259 A1 | 9/2014 | Dumser et al. |
| 2014/0305394 A1* | 10/2014 | Woerner ............... F02P 23/04 123/143 B |
| 2015/0040845 A1* | 2/2015 | Chiera ................ F02B 19/108 123/41.32 |
| 2015/0184578 A1 | 7/2015 | Oda |

FOREIGN PATENT DOCUMENTS

| | | | |
|---|---|---|---|
| EP | 3045715 A1 * | 7/2016 | ............ F02B 19/08 |
| JP | 58-162773 | 9/1983 | |
| JP | 2001-3753 | 1/2001 | |
| JP | 2005-240586 | 9/2005 | |
| JP | 2006-329092 | 12/2006 | |
| JP | 2010-261407 | 11/2010 | |
| JP | 2012-36904 | 2/2012 | |
| JP | 2015-134534 | 7/2015 | |
| WO | WO 2011/085853 | 7/2011 | |

* cited by examiner (EMBODIMENT 1)

(EMBODIMENT 1)

LASER IGNITION DEVICE

This application is the U.S. national phase of International Application No. PCT/JP2015/071192 filed Jul. 27, 2015 which designated the U.S. and claims priority to JP Patent Application No. 2014-156005 filed Jul. 31, 2014, the entire contents of each of which are hereby incorporated by reference.

TECHNICAL FIELD

The present invention generally relates to a laser ignition device which is installed in an engine and works to optically focus a pulsed laser, as outputted from a laser oscillator, in a prechamber communicating with a combustion chamber of the engine to ignite an air-fuel mixture delivered into the combustion chamber, thereby jetting flame from the prechamber into the combustion chamber to ignite the engine.

BACKGROUND ART

Recently, laser ignition devices have been studied, with regard to various issues, which use a semiconductor laser as an excited laser source for less ignitable internal combustion engines, such as cogeneration gas fuel engines or lean burn engines, and work to deliver an excited laser, as emitted from the semiconductor laser, to a Q-switched laser resonator to create a high-energy density pulsed laser and to focus it on an air-fuel mixture using a light-collecting means to enhance the energy density thereof, thereby igniting the air-fuel mixture.

Such a type of laser ignition device has a laser spark plug with a heat-resisting optical window formed in a top end thereof to protect an optical device such as a condenser lens or a laser resonator from high pressure or intense heat generated in a combustion chamber.

Generally, lubricating oil is put into between a cylinder which defines a combustion chamber of an internal combustion engine and a piston moving up and down within the cylinder in order to reduce friction therebetween. This may cause the lubricating oil to be diffused in the form of a spray within the combustion chamber and transported by a gas flow created in the cylinder together with the air-fuel mixture so that it adheres to the surface of the optical window.

The lubricating oil usually contains non-combustible components such as metal which may be changed into oxides and deposited on the optical window with long-time use, thereby resulting in a reduction in transmitted power of the pulsed laser.

In order alleviate the above problems, Japanese Translation of PCT Internal Application Publication No. 2013-527376 teaches an external laser-induced ignition device which includes an aperture (74) through which a laser beam passes toward a prechamber (110) disposed in an end (381) of a casing (38) closer to a combustion chamber and at least one gas supply port (120) which connects between an internal space (111) of the prechamber and the combustion chamber. The laser-induced ignition device creates a fluid flow (F) entering the aperture at a minimum angle ε of 45° to a longitudinal axis of a laser spark plug when the fluid flow passes through the gas supply port and then flows into the prechamber.

SUMMARY OF THE INVENTION

Problem to be Solved by the Invention

However, in the case where the prechamber formed in the end of the housing and the combustion chamber of the internal combustion engine are communicated with each other, like in the conventional laser ignition device, through the gas supply port, the air-fuel mixture in the combustion chamber will pass through the gas supply port to form a strong tumble flow in the prechamber in a compression stroke. This may cause a flame kernel, as created by focusing a pulsed laser on the air-fuel mixture delivered into the prechamber in an internal combustion engine, such as a gas engine, in which the air-fuel mixture is low in density and less ignitable, to be blown out by the strong tumble flow.

The prior art structure does not avoid the entry of atomized lubricating oil into the prechamber along with the strong in-cylinder gas flow. In order to avoid adhesion of the lubricating oil to a combustion window, the aperture needs to have a height above a certain level. This will inevitably result in an increase in thermal capacity of the aperture, which may lead to instability of the ignition arising from extinguishing action during early generation of the flame kernel or alternatively to accumulation of thermal energy added by the flame to the aperture, thus causing preignition.

Even if the amount of lubricating oil directly attached to the combustion window is decreased, the entry of droplets of the lubricating oil into the prechamber is not avoided, thus causing deposits to be formed on an inner periphery of the aperture with long-term use. If the deposits at least partially block an optical path of the pulsed laser, it will result in diffraction of the pulsed laser, so that the pulsed laser is not focused at a desired energy density, thereby leading to instability of the ignition.

The invention was made in view of the above problems and provides a laser ignition device which has a simple structure, works to control adhesion of lubricating oil to an optical window, and achieves increased combustion speed to ensure the stability in ignition.

Means for Solving the Problem

The laser ignition device (1, 1a to 1f) of this invention is mounted in an engine (5) and is at least equipped with a laser spark plug (10) and a prechamber cap (15).

The laser spark plug (10) of this invention includes a condenser lens (101) and an optical window (100). The condenser lens works to focus a pulsed laser ($LSR_{PLS}$) emitted from a lasing device on a given converging point (FP). The optical window is disposed between the condenser lens and the converging point and protects the condenser lens from combustion heat and combustion pressure occurring in a combustion chamber of said engine.

The prechamber cap (15) of this invention is disposed between said optical window and said combustion chamber and includes a bottomed cylindrical prechamber (152) which is defined to have a fixed volume, a prechamber throat portion (151) which is smaller in sectional area than the prechamber, extends in an axial direction, and has an end fluidly communicating with said prechamber and has an end closed, and a plurality of prechamber spray holes (150) which are drilled in the closed end of the prechamber throat portion and communicate with a combustion chamber (500) of said engine.

Further, the laser ignition device (1, 1a to 1f) of this invention has the converging point located inside the prechamber, ignites an air-fuel mixture delivered into the prechamber is ignited, and juts combustion flames from the prechamber into the combustion chamber to fire said engine. The center axis ($AX_F$) of said prechamber is oriented eccentrically from the center axis ($AX_S$) of said prechamber throat portion in a horizontal direction.

Effect of the Invention

The prechamber and said prechamber throat portion have the axes different from each other, thus enabling said optical window to be arranged at a location offset from a direction of travel of oil mist carried by a gas flow in said prechamber. The flow velocity of an air-fuel mixture in the prechamber is decreased by a difference in sectional area between said prechamber and said prechamber throat portion. Thus, even when having been delivered to said prechamber in the course of a combustion cycle of said engine, the air-fuel mixture which flows backward from said combustion chamber to said prechamber through said prechamber spray holes and the prechamber throat portion contains the oil mist, the amount of oil mist is reduced to minimize adhesion of the oil mist to the optical window.

In the case where the center axes of said prechamber spray holes are formed in a twisted direction relative to the center axis of said prechamber throat portion, swirl flows are produced in the prechamber throat portion, so that the air-fuel mixture reaches around the optical window while the oil mist adhered to the inner wall is decreased by a centrifugal force oriented in a horizontal direction perpendicular to an axial direction to decrease the amount of oil mist contained in the air-fuel mixture. This further decreases the amount of oil mist attached to the optical window.

In the case where the center axes of said prechamber spray holes are collectively formed relative to the center axis of said prechamber throat portion, a straight flow is generated which moves straight in the prechamber throat. The flow velocity and orientation of the air-fuel mixture change in the prechamber, thereby causing droplets of oil mist which are greater in specific gravity to impact on the inner wall of the prechamber, thereby resulting in a decrease in amount of the oil mist contained in the air-fuel mixture.

Further, said converging point is located inside said prechamber, thereby causing the air-fuel mixture delivered into said prechamber to be burned without a risk that an initial flame is blown out by a gas flow in the prechamber, so that combustion flames are jetted from the prechamber spray holes to ensure the stability in firing the air-fuel mixture in the combustion chamber.

EMBODIMENT FOR CARRYING OUT THE INVENTION

Figure 1A:
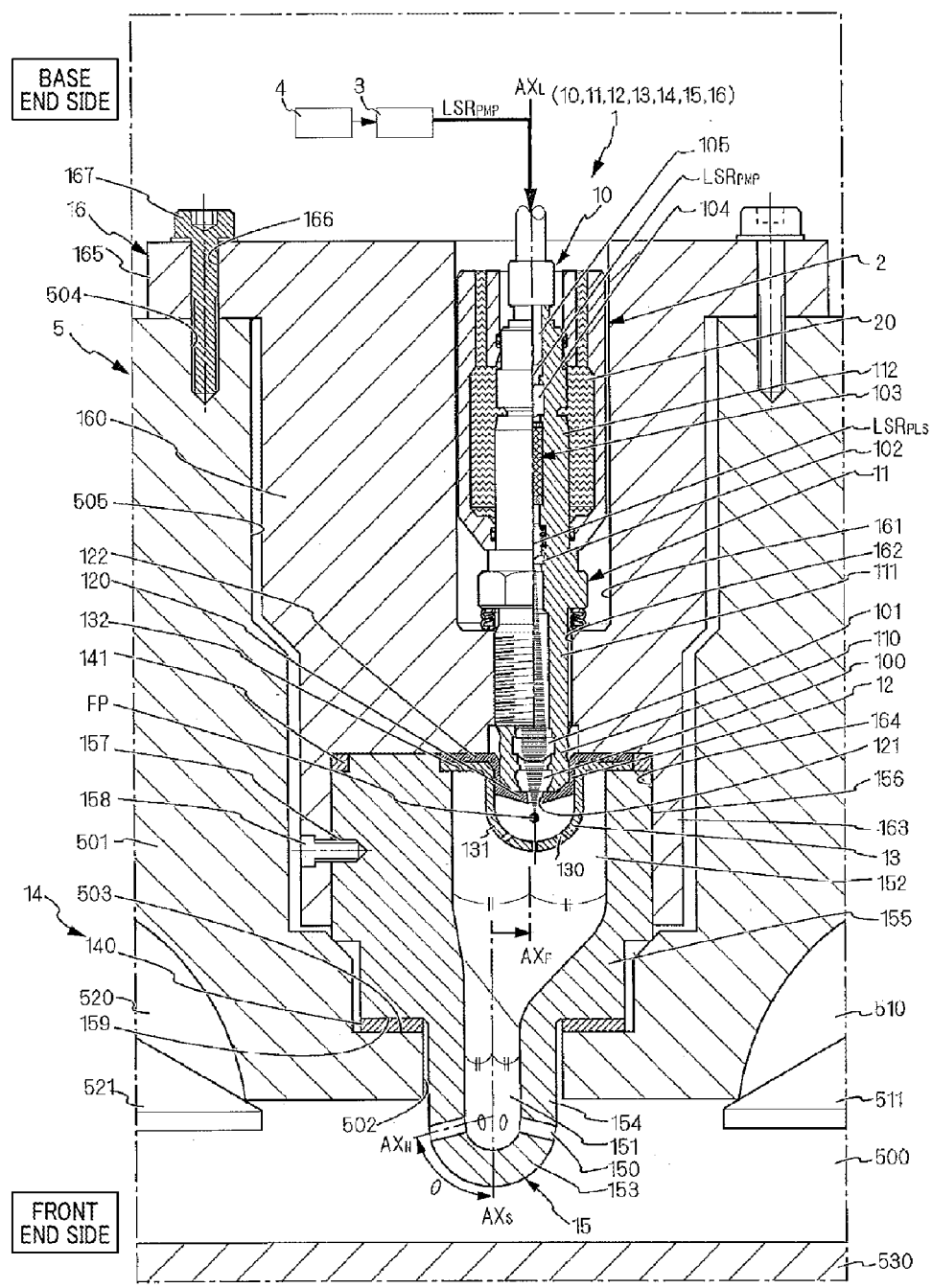
FIG. 1A is a vertical sectional view which illustrates a laser ignition device 1 of the first embodiment of the invention.

The laser ignition device 1 of the first embodiment will be described below with reference to FIGS. 1A and 1B.

The laser ignition device 1 is constructed to be installed in the internal combustion engine 5 and at least includes the laser spark plug 10 and the prechamber cap 15.

The laser spark plug 10 at least includes the condenser lens 101 and the optical window 100. The condenser lens 101 works to converge the pulsed laser $LSR_{PLS}$, as emitted from the laser resonator 103 provided as a lasing device, on a given converging point FP. The optical window 100 is disposed between the condenser lens 101 and the converging point FP and protects the condenser lens 101 from combustion heat and combustion pressure, as generated in the combustion chamber 500 of the internal combustion engine 5.

The prechamber cap 15 of this invention includes the prechamber 152, the prechamber throat portion 151, and a plurality of prechamber spray holes 150. The prechamber 152 is located between the optical window 100 and the combustion chamber 500 and defined in a cylindrical form to have a certain volume. The prechamber throat portion 151 has a sectional area smaller than that of the prechamber 152 and extends in an axial direction. The prechamber throat portion 151 communicates at one end with the prechamber 152 and has the other end closed to have a bottom. The prechamber spray holes 150 are drilled in at the closed end side of the prechamber throat portion 151 and communicate with the combustion chamber 500.

The laser ignition device 1 has the converging point FP defined inside the prechamber 152 and serves to ignite an air-fuel mixture delivered into the prechamber 152 to jet combustion flames from the prechamber 152 into the combustion chamber 500 to fire the internal combustion engine 5. The laser ignition device is essentially engineered to have a center axis $AX_F$ of the prechamber 152 placed in misalignment with a center axis $AX_S$ of the prechamber throat portion 151 in the horizontal direction.

In the following discussion, a portion of the laser ignition device 1 which is exposed to the combustion chamber 500 of the internal combustion engine 5 and from which the pulsed laser $LSR_{PL}$ is emitted will be referred to as a front end side, while a portion of the laser ignition device 1 into which an excited laser $LSR_{PMP}$ is externally inputted will be referred to as a rear end or a base end side.

The laser ignition device 1 is capable of exhibiting excellent ignitability in less ignitable engines such as gas engines. An example where the laser ignition device 1 of the invention is used with a cogeneration gas engine using a gas fuel as an internal combustion engine, for example, a large-sized gas engine in which a bore diameter of a cylinder is 15 to 30 cm will be described below.

The laser ignition device 1 of this invention, however, does not limit the engine to be ignited to gas engines and may alternatively be used with internal combustion engines, such as gasoline engines or diesel engines, which use liquid fuel or external combustion engines such as jet engines.

The laser ignition device 1 at least includes the laser spark plug 10, the protective plate 12, the cover body 13, the seal member 14, the prechamber cap 15, and the holder 16. The laser spark plug 10 is equipped with the optical window 100 from which the pulsed laser $LSR_{PLS}$ is emitted. The protective plate 12 covers the optical window 100. The cover body 13 covers the protective plate 12. The prechamber cap 15 is arranged on the front end side of the laser spark plug 10. The holder 16 integrally stores the above elements therein and secures them to the internal combustion engine 5.

The laser spark plug 10 has the optical window 100, the condenser lens 101, the pulsed laser expanding lens (i.e., a beam expander) 102, the laser resonator 103, the collimating lens 104, and the optical fiber 105 arranged from the combustion chamber side in alignment with each other and stores them in the cylindrical holder 11.

The optical fiber 105 transmits the excited laser $LSR_{PMP}$, as outputted from an excited laser source such as a semiconductor laser, not shown, externally disposed. As the optical fiber 105, a known optical fiber may be used in which a numerical aperture is 0.22 or less, and a core diameter is 600 μm or less.

The excited laser $LSR_{PMP}$, as outputted from the tip of the optical fiber 105, is made parallel by the collimating lens 104 and then delivered to the laser resonator 103. The collimating lens is made from known optical material such as optical glass, heat resistant glass, silica glass, or sapphire glass.

The laser resonator 103 may be implemented by a known passively Q-switched laser resonator.

The laser resonator 103 is made up of a laser medium, an antireflection film disposed on an entrance side thereof, a total reflecting mirror, a saturable absorber disposed on an exit side thereof, and an exit mirror formed by a partially reflective film.

The laser medium may be made of a known lasing medium such as Nd:YAG in which single-crystal YAG is doped with Nd. The total reflecting mirror is formed so as to permit the excited laser $L_{PMP}$ whose wavelength is shorter to be transmitted therethrough, but totally reflect the pulsed laser $L_{PLS}$ whose wavelength is longer. The saturable absorber is made of Cr:YAG in which single-crystal YAG is doped with $Cr^{4+}$.

The laser resonator 103 is designed so that Nd in the laser medium is excited by the excited laser $L_{PM}$, as inputted thereinto, to radiate, for example, light of 1064 nm and store it in the laser medium. When the level of energy in the laser medium reaches a given level, it will cause the pulsed laser $LSR_{PLS}$ whose energy density is high to be emitted from an output mirror disposed on the front end side. The pulsed laser $LSR_{PLS}$, as outputted from the laser resonator 103, is expanded by the pulsed laser expanding lens 102 and then focused by the condenser lens 101, thereby increasing the energy density at the converging point FP to change the air-fuel mixture around the converging point FP into plasma to create a flame kernel.

The pulsed laser expanding lens 102 and the condenser lens 101 are made from known optical materials such as optical glass, heat resistant glass, silica glass, or sapphire glass. The optical window 100 is provided on the front end side of the condenser lens 101 to protect other optical devices from the combustion pressure or combustion heat generated in the combustion chamber 500 or the prechamber 152.

The optical window 100 is made from a known heat-resistant optical material such as heat resistant glass, silica glass, or sapphire glass.

Each of the above optical devices has an antireflection film affixed to the surface thereof to enhance the penetration efficiency of laser light. The conventional laser ignition device requires energy of, for example, 10 mJ/pulse, but however, the laser ignition device 1 of this invention is capable of igniting the air-fuel mixture, as conducted into the internal combustion engine 5 using energy of 2 to 3 mJ/pulse. Further, the conventional excitation light source whose peak power is 500 W is used, but however, the excitation light source 3 of the laser ignition device 1 which is designed so that an excited laser has a peak power of 180 W may be used.

The housing 11 is made up of the housing front end portion 110 which is made of a stainless cylinder and stores the optical window 100 and the condenser lens 101 in a front end thereof, the external threaded portion 111 which is fastened to the holder 16 without exerting stress on the laser spark plug 10 and the housing base end portion 112 which stores the pulsed laser expanding lens 102, the laser resonator 103, the collimating lens 104, and the front end of the optical fiber 105 on the base end side of the external threaded portion 111.

The protective plate 12 is disposed to cover a surface of the optical window 100 from which laser light is emitted.

The protective plate 12 is made of, for example, a heat resistant metallic material such as stainless steel. The protective plate 12 at least includes the plate base portion 120 which is of a frusto-conical shape with an outer periphery whose diameter decreases toward a front end side thereof and the laser-passing hole 121 which is provided in the center thereof and opened without obstructing an optical path of the pulsed laser $LSR_{PLS}$ emitted from the optical window 100.

The laser-passing hole 121 has a tapered frusto-conical inner peripheral surface which is greater in diameter at a base end side thereof and smaller in diameter at a front end side thereof. It has been found that the beneficial effects of the invention are obtained by selecting an opening diameter on the front end side of the laser-passing hole 121 to be greater than or equal to 1.5 mm and smaller than or equal to 3.5 mm. In tests, as described later, the opening diameter is set to 1.76 mm.

The greater the thickness of the protective plate 12, the smaller the amount of oil mist adhered to the optical window 100 will be, but an increase in thickness of the protective plate 12 requires the need for increasing the distance between the surface of the optical window 100 and the converging point FP of the pulsed laser. When the focal distance is increased to more than a certain value, it is necessary to increase the energy supplied to the laser ignition device 1. However, an increase in the supplied energy may result in an increase in damage to the optical system, which leads to a deterioration of durability thereof. In internal combustion engines, the combustion stroke is usually repeated. Thus, if the protective plate 12 or the cover body 13 is not cooled within a given period of time, it may result in a combustion error such as preignition. Both the improvement of the combustion velocity and the elimination of the preignition may be achieved by selecting the thickness of the protective plate 12 to be a suitable value.

In this embodiment, the distance between the surface of the optical window 100 and the converging point FP is 6.5 mm. The thickness of the protective plate 12 is 3 mm. The distance between the surface of the optical window 100 and the location of the base end opening of the protective plate 12 is 1 mm. The distance between the surface of the base end of the protective plate 12 and the converging point FP is 2.5 mm. The thickness of the protective plate 12 is, however, not limited to the above value, but may be changed up to 10 mm depending upon a focal distance of the laser ignition device 1 used.

The protective plate 12 is disposed to be detachable for facilitating the ease with which deposits on the surface thereof with long-term use are removed and also for evaluating the performance thereof without disassembling the optical system.

The protective plate 12 has a frusto-conical external form whose diameter decreases toward the front end side thereof in order to change a flow of oil mist downward to avoid the entrance of the oil mist into the protective glass side or alternatively has a curved outer surface which is inwardly recessed to decrease a thermal capacity thereof to reduce a quantity of heat received from the flame for avoiding preignition.

The protective plate 12 will also be described later in detail with reference to FIGS. 14A and 14B.

In this embodiment, the cover body 13 that is one of major parts of the invention is arranged on the front end side of protective plate 12. The cover body 13 is made from a heat resistant metallic material such as pure nickel, nickel-iron alloy, or stainless steel and formed to have a hemispherical shape which covers the front end side of the protective plate 12. The cover body 13 has a plurality of cover spray holes 130 which communicate inside and outside the cover body 13. The cover body 13 will also be described later in detail with reference to FIGS. 19A and 19B. The protective plate 12 and the cover body 13 of this embodiment are held by the prechamber cap 15 and the holder 16 and permitted to be easily detached by removing the prechamber cap 15 without adversely affecting the optical system of the laser spark plug 10.

The prechamber cap 15 that is the second of the major parts of the invention is disposed to cover the front end side of the cover body 13. In the prechamber cap 15, the prechamber throat portion 151 and the prechamber 152 which are different in inner diameter from each other are disposed to have center axes $AX_S$ and $AX_F$ eccentric from each other in a horizontal direction and fluidly communicate with each other. The prechamber cap 15 is made from a heat resistant metallic material such as nickel-iron alloy or stainless steel and shaped in a cylindrical bottomed form with a closed end.

The prechamber cap 15 has a stepped cylindrical outer shape and includes the small-diameter portion 154 which has a smaller outer diameter and is disposed on the front end side and the large-diameter portion 155 which has a larger outer diameter and is disposed on the base end side. The large-diameter portion 155 has the center axis aligned with the center axis $AX_S$ of the small-diameter portion 154. The outer shape of the prechamber cap 15 is made in a concentric stepped cylindrical form, thereby facilitating the installation thereof in the cylinder head 501 of the internal combustion engine 5.

The small-diameter portion 154 has formed therein the prechamber throat portion 151 which axially extends along the center axis $AX_S$ of the small-diameter portion 154. The prechamber throat portion 151 has a front end closed by the cap bottom portion 153. The cap bottom portion 153 which is the closed end of the prechamber throat portion 151 has formed therein a plurality of prechamber spray holes 150 whose inner diameter is smaller than that of the prechamber throat portion 151 and which establish communication between the combustion chamber 500 and the prechamber throat portion 151.

The prechamber spray holes 150 are inclined in a fan-shape and drilled so that an angle θ which the center axis $AX_N$ makes with the center axis $AX_S$ when the center axis $AX_N$ is projected onto the center axis $AX_S$ falls in a given range (e.g., 10° to 170°). The gas flow through the prechamber spray holes 150, therefore, has components in the axial and radial directions both in the compression stroke and in the combustion stroke.

Figure 1B:
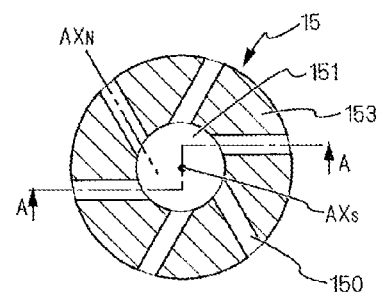
FIG. 1B is a transverse sectional view which schematically illustrates a cap end of the laser ignition device 1 in FIG. 1A.

Further, the prechamber spray holes 150 of this embodiment, as clearly illustrated in FIG. 1B, have the center axis $AX_N$ offset from the center axis $AX_S$ of the prechamber throat portion 151 without intersecting with each other. After having passed through the prechamber spray holes 150, the gas flow creates a swirl which travels in the axial direction while turning in the circumferential direction thereof.

The prechamber throat portion 151 axially extends along the center axis $AX_S$ of the small-diameter portion 154. The prechamber throat portion 151 has the base end whose diameter gradually increases and which fluidly communicates with the prechamber 152. The prechamber 152 extends inside the large-diameter portion 155 along the center axis $AX_F$ offset from the center axis $AX_S$ of the small-diameter portion 154. Tests, as will be described later, were made in an example where the center axis $AX_F$ of the prechamber 152 is offset from the center axis $AX_S$ of the prechamber throat portion 151 by 3 mm.

The prechamber 152 is formed to have a diameter greater than that of the prechamber throat portion 151.

Specifically, the prechamber 152 preferably has a transverse sectional area which is 1.4 to 3 times greater than that of the prechamber throat portion 151.

In this embodiment, the tests were made in the example where the transverse sectional area of the prechamber 152 is 2.8 times greater than that of the prechamber throat portion 151.

The optical window 100 is arranged on the base end side of the prechamber 152 where the cover body 13 and the protective plate 12 are held. The base end side of the prechamber 152 is hermetically closed by the seal member 141 and the holder 16. In this embodiment, the optical window 100 and the cover body 13 are arranged coaxially with each other to have center axes aligned with the center axis $AX_L$ in order to define the focal point FP of the pulsed laser $LSR_{PLS}$ within the cover body 13.

The converging point FP is preferably located on the center of a vortex flow occurring in the cover body 13 and may be changed depending upon flows in the cover body 13 which will change as a function of the number or orientation of the cover spray holes 130. This is because the flow velocity is the lowest on the center of the vortex flow where the air-fuel mixture stays, thus accelerating the absorption of energy of the focused pulsed laser $LSR_{PLS}$, so that the surrounding air-fuel mixture is drawn toward the center of the flame kernel, and the initial flame kernel grows without approaching the cover body 13, which will accelerate the rate at which the flame grows.

The holder 16 is made from a heat resistant metallic material such as pure nickel or stainless steel and shaped to be cylindrical. The holder 16 includes the holder base portion 160, the plug housing hole 161, the plug fixing internal thread portion 162, the cap holding portion 163, the cap housing inner peripheral surface 164, the flange portion 165, and the through-holes 166. The holder 16 is secured in a screw fashion to the cylinder head 501 by fastening the holder fixing bolts 167 into the through-holes 166 formed in the flange portion 165. In the plug housing hole 161 formed inside the holder 16, the cylindrical housing 11 which constitutes the laser spark plug 10 is retained.

The cap holding portion 163 is shaped to be cylindrical. The cap holding portion 163 has formed therein the cap housing inner peripheral surface 164 which is separate from the large diameter portion-outer peripheral surface 156 of the prechamber cap 15 by a given clearance, thereby facilitating quick removal of the prechamber cap 15. The prechamber cap 15 is put in the cap holding portion 163 of the holder 16. After the prechamber cap 15 is positioned, the large-diameter portion 155 of the prechamber cap 15 and the cap holding portion 163 of the holder 16 are joined together by positioning bolts 158. The plug fixing internal thread portion 162 is threadably secured to the external threaded portion 111 of the housing 11 to retain the laser spark plug 10 inside the holder 16.

The seal members 140 and 141 (i.e., seal members 14) are disposed between the prechamber cap 15 and the cylinder head 501 and between the prechamber cap 15 and the holder 16 to create air-tight seals, respectively. The seal members 140 and 141 are made of heat resistant metal or an elastic member such as heat resistant rubber. The cap bottom portion 153 extends outside the plug hole 502 formed in the cylinder head 501 and is exposed to the combustion chamber 500, so that the prechamber spray holes 150 communicate with the combustion chamber 500.

The above described holder 16 is merely an example and may be designed in another form as long as it retains the laser spark plug 10 constituting the laser ignition device 1 of this embodiment, the protective plate 12, the cover body 13, and the prechamber cap 15 together therein. In such a case, the holder 16 may be placed in contact with the cylinder head 503 to air-tightly isolate the combustion chamber 500 from the outside.

Although it is not essential for the invention, the cooler 2 is disposed on the base end side of the laser spark plug 10 in this embodiment. The cooler 2 is of a cylindrical shape and fit to embrace an outer periphery of the housing base end portion 112 of the housing 11. The cooler 2 has the cooling jacket 20 disposed therein. Cooling water is circulated in the cooling jacket 20 to absorb heat generated by the laser resonator 103, thereby ensuring the stability in outputting the pulsed laser $LSR_{PLS}$.

The internal combustion engine 5 in which the laser ignition device 1 of this invention will be described below in brief.

The internal combustion engine 5 of this embodiment is a gas fuel engine in which gas fuel is delivered into the combustion chamber 500 and burned therein and used in a generator of a cogeneration system. The combustion chamber 500 is defined by at least an inner wall of the cylinder head 501 and a head surface of the piston 530 retained to be reciprocal vertically in a cylinder, not shown.

The cylinder head 501 has formed therein the intake cylinder 510 and the exhaust cylinder 520 which are opened or closed by the intake valve 511 and the exhaust valve 521, respectively. The number of the intake cylinder 510 and the exhaust cylinder 520 is selected depending upon usage or size of the internal combustion engine.

In the internal combustion engine 5, the cap bottom portion 153 of the prechamber cap 15 is located on the center of the cylinder which defines the combustion chamber 500 and exposed from the plug hole 502 formed in the cylinder head 501 to the combustion chamber 500. The installation of the laser ignition device 1 in the internal combustion engine 5 is not limited to the one in this embodiment, but may be achieved in another known way to mount ignition plugs in an internal combustion engine.

In this embodiment, the laser ignition device 1 has the power supply 4 and the excitation light source 3 disposed outside it. The excitation light source 3 is responsive to an input of energy from the power supply 4 to emit the excited laser $LSR_{PMP}$. The excited laser $LSR_{PMP}$, as emitted from the excitation light source 3, is converted into the pulsed laser $LSR_{PLS}$ in the laser spark plug 10. The pulsed laser $LSR_{PLS}$, as outputted through the optical window 100, is focused on the converging point FP within the air-fuel mixture to ignite the air-fuel mixture. The embodiment is, however, not limited to such arrangements.

For instance, a region in the housing 11 of the laser spark plug 10 where the lasing device is installed may be altered as needed.

In this invention, the excitation light source 3 equipped with a semiconductor laser may be installed in the laser spark plug 10 as the lasing device. The collimating lens 104 and the laser resonator 103 may also be arranged outside the laser spark plug 10.

Further, the excitation light source 3 which is made of a surface-emitting device made up of a planar array of light emitters implemented by semiconductor lasers may be disposed on the base end side of the laser spark plug 10.

Figure 2A:
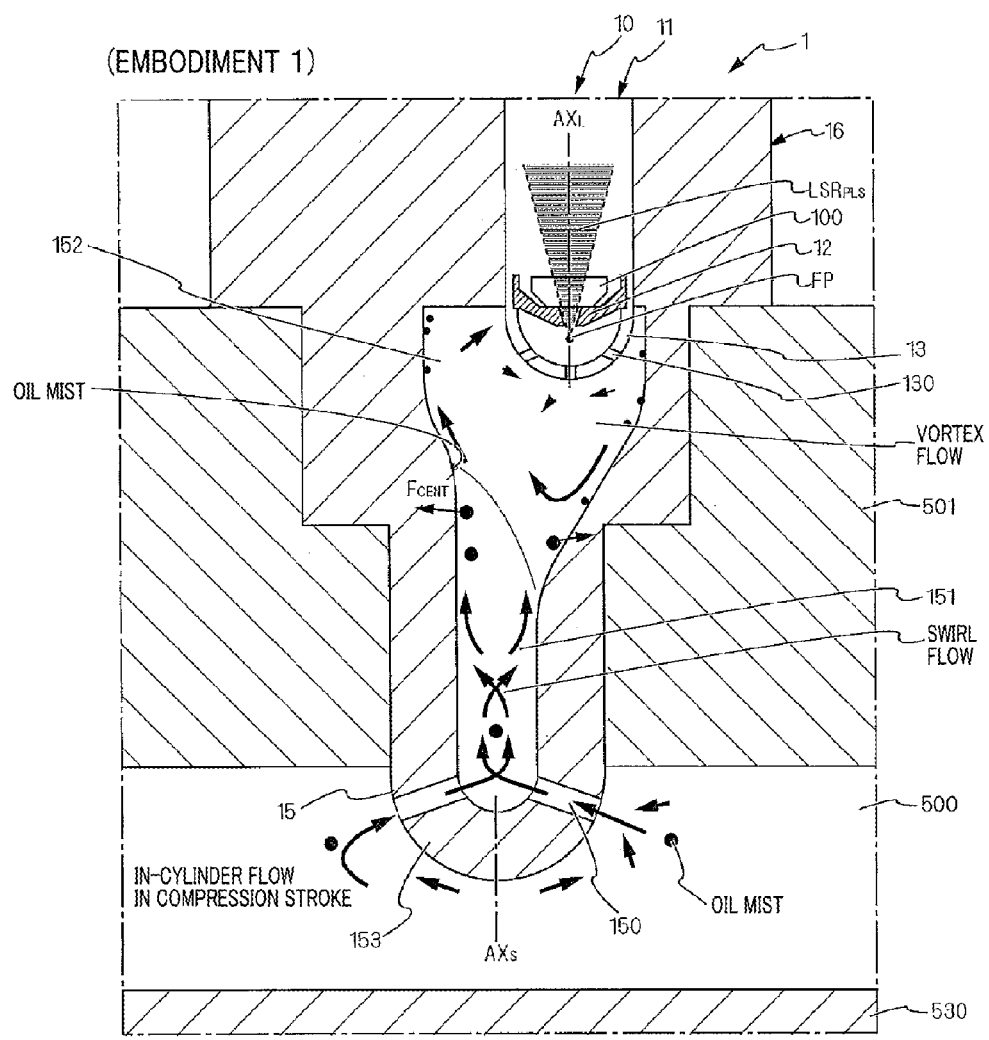
FIG. 2A is a vertical sectional view for explanation of beneficial effects offered by a laser ignition device in the first embodiment of the invention.
Figure 2B:
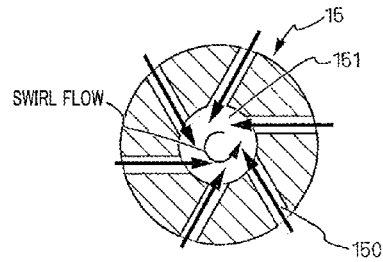
FIG. 2B is a transverse sectional view which illustrates a gas flow generated on a tip of a cap of a laser ignition device 1 in a compression stroke.

The beneficial advantages offered by the first embodiment of the invention will be described below with reference to FIGS. 2A and 2B.

In this embodiment, the prechamber spray holes 150 are arranged at a twisted orientation eccentrically from the center axis $AX_S$ of the prechamber throat portion 151, thereby causing the air-fuel mixture in the combustion chamber 500 to create swirl flows when the air-fuel mixture passes through the prechamber spray holes 150 and then enters the prechamber throat portion 151 during the compression stroke. This causes the gas flows to travel upward while rotating in the circumferential direction within the prechamber throat portion 151.

Therefore, centrifugal force $F_{CNT}$ is exerted in a direction perpendicular to the center axis $AX_S$ on the oil mist having entered the prechamber throat portion 151 along with the air-fuel mixture, so that the oil mist hits on and is then adhered to the inner periphery of the prechamber throat portion 151. This causes droplets of the oil mist contained in the air-fuel mixture to disappear in a descending order of size.

Further, when having entered the prechamber 152 through the prechamber throat portion 151, the oil mist is subjected to a drop in flow velocity arising from an increase in volume from the prechamber throat portion 151 to the prechamber 152, thus resulting in a decrease in force which moves smaller droplets of the oil mist upward. This causes the smaller droplets of the oil mist to hit on and then adhere to the wall surface of the prechamber 152, which minimizes a probability that the oil mist impacts the optical window 100.

Further, in this embodiment, the protective plate 12 is disposed to cover the surface of the optical window 100. The cover body 13 is also arranged to cover the protective plate 12. This results in misalignment of the lengthwise direction of the cover spray holes 130 drilled in the cover body 13 with the direction of the centrifugal force $F_{CNT}$ which is exerted by the vortex flows in the prechamber 152 on the oil mist, so that only the air-fuel mixture is delivered into the cover body 13, and most of the oil mist hardly passes through the cover spray holes 130.

The optical window 100 is covered by the protective plate 12. If, therefore, the oil mist flows into the cover body 13, it is difficult for gas flows in the cover body 13 which are weak to exert on the oil mist a degree of force strong enough to make the oil mist pass through the laser-passing hole 121. Consequently, even if a small amount of oil mist enters the cover body 13, most of the oil mist is attached to the surface of the protective plate 12, so that the oil mist hardly adheres to the surface of the optical window 100.

The fuel used in this embodiment is gas fuel. The air-fuel mixture flowing in the prechamber 152 is, therefore, low in flow velocity and enters the cover body 13. In this condition, when the pulsed laser $LSR_{PLS}$, as delivered from the laser spark plug 10 through the optical window 100, is focused on the converging point FP in the cover body 13, the energy density will be extremely high on the converging point FP, so that the air-fuel mixture around the converging point FP is changed into plasma to create a flame kernel.

The flame occurring in a limited space in the cover body 13 usually rapidly expands, which elevates the pressure in the cover body 13, so that flames jet into the prechamber 152 through the cover spray holes 130. The flames, having jetted into the prechamber 152, propagate to the air-fuel mixture existing in the prechamber 152.

In the prechamber 152, complicated flows that are overlaps of vortex flows in the vertical and swirl flows in the horizontal direction are created and well mixed with the flames jetted from the cover spray holes 130, thereby accelerating a combustion reaction to achieve further growth of the flames. This results in rapid expansion of volumes of the flames to elevate the pressure in the prechamber 152, so that the flames move to the prechamber throat portion 151 continuing from the prechamber 152.

The prechamber throat portion 151 is shaped to have a smaller diameter, so that the flames are accelerated when passing through the prechamber throat portion 151 and then burst into the combustion chamber 50 through the prechamber spray holes 150 formed in the front end. Further, the flames, as jetted from the prechamber spray holes 150, create swirl flows thereof in a direction opposite that in the compression stroke, thereby developing a strong reaction with the air-fuel mixture in the combustion chamber 500, so that the flames growth quickly. Accordingly, according to the invention, the optical window 100 is free from contamination by the oil mist. It is, thus, possible to keep the optical window 100 from needing to be cleaned for an extended period of time. Additionally, it has also been found that the rate of growth of the flames is high, and easy ignition of the fuel is achieved.

Figure 3A:
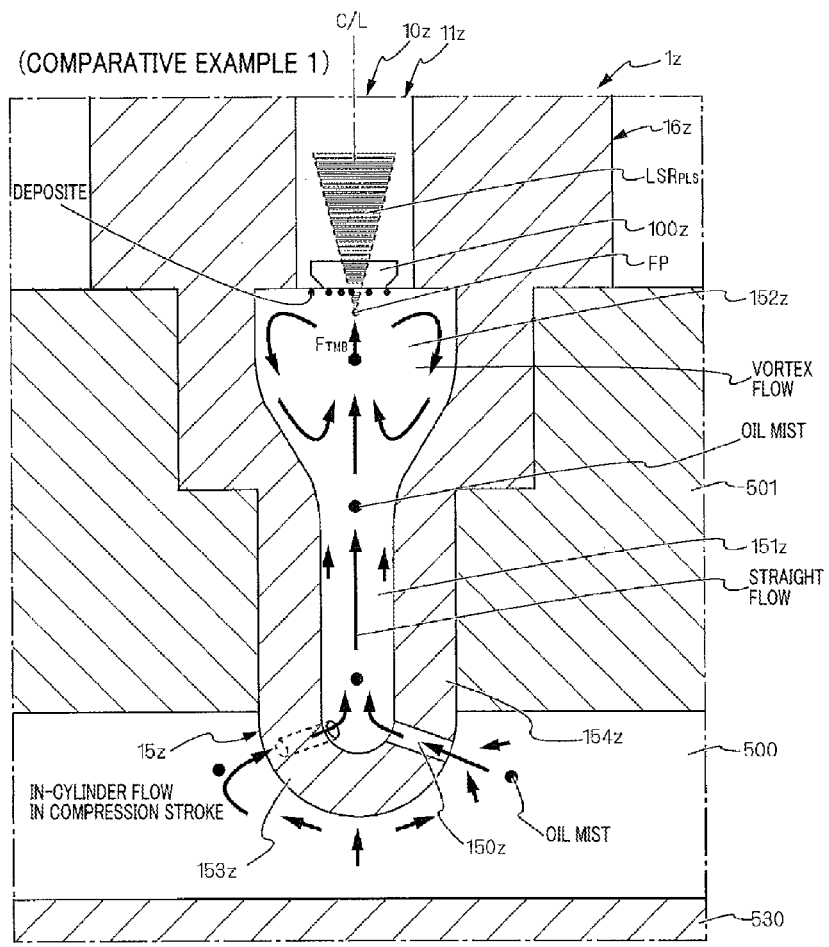
FIG. 3A is a vertical sectional view which illustrates, as a comparative example 1, a structure of a laser ignition device 1z having a laser spark plug mounted in a conventional prechamber gas engine and problems thereof.
Figure 3B:
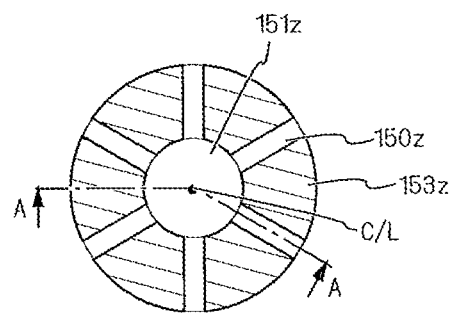
FIG. 3B is a transverse sectional view which schematically illustrates a tip of a cap of the laser ignition device 1z in FIG. 2A.
Figure 3C:
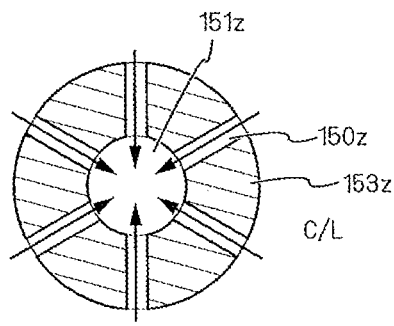
FIG. 3C is a transverse sectional view which illustrates a gas flow generated on a tip of a cap in a comparative example 1 in a compression stroke.

The laser ignition device 1z that is a comparative example 1 designed not to offer the beneficial advantages of the present invention will be described below with reference to FIGS. 3A, 3B, and 3C.

The same reference numbers, as employed in the first embodiment, will refer to parts common to those in the first embodiment, while subscripts "z" are added to different parts. The explanation of the common parts will, thus, be omitted. Only distinctive parts will be referred to below.

In this invention, it is basically essential to have the prechamber throat portion 151 and the prechamber 152 which are arranged eccentrically with each other and communicate with each other within the prechamber cap 15. The laser ignition device 1z, as illustrated as the comparative example 1, has the prechamber throat portion 151z and the prechamber 152z oriented coaxially with each other. Further, the laser spark plug 10z is located to have an optical axis thereof aligned with the center of the prechamber 152z. The optical window 100z is exposed to the base end of the prechamber 152z.

In the first embodiment, the plurality of prechamber spray holes 150 are drilled so as to be offset from the center axis $AX_S$ of the prechamber throat portion 151, while in the comparative example, 1, the plurality of prechamber spray holes 150z are drilled so as to extend toward the center axis $AX_S$ of the prechamber throat portion 151z. This will cause the air-fuel mixture in the combustion chamber 500 to flow from the front end sides of the prechamber spray holes 150z into the prechamber spray holes 150z to create straight flows thereof which are oriented to the center axis $AX_S$ of the prechamber throat portion 151z and discharged from the base end sides of the prechamber spray holes 150z into the prechamber throat portion 151z.

Simultaneously, the oil mist which spreads in the combustion chamber 500 enters the prechamber throat portion 151z together with the air-fuel mixture. The flow velocity in the prechamber throat portion 151z is higher around the center thereof, while a layer of the flow which is lower in velocity is created near the inner periphery of the prechamber throat portion 151z and moves straight toward the base end side of the prechamber throat portion 151z.

When entering the larger-diameter prechamber 152z after having passed the prechamber throat portion 151z, the air-fuel mixture is subjected to a drop in flow velocity due to a sudden change in volume from the prechamber throat portion 151z and creates tumble flows which turn vertically and are oriented from the center toward the outside of the prechamber 152z. At this time, the oil mist which is higher in density than the air-fuel mixture is usually moved by inertia thereof in the axial direction. The oil mist is also subjected to the centrifugal force $F_{TMB}$ arising from the tumble flows occurring in the prechamber 152z in a direction in which the oil mist heads, so that it continues to travel straight and then adhere to the surface of the optical window 100xz exposed to the center of the base end of the prechamber 152z.

The oil mist attached to the surface of the optical window 100z is directly burned by irradiation the pulsed laser $LSR_{PLS}$ or indirectly burned by flame generated in the prechamber 152z, so that most of it is burned, but metallic components intentionally added as modifiers to or avoidable impurities contained in lubricating oil form incombustible oxides which are then accumulated as deposits on the surface of the optical window 100z with long-term use. The deposits may result in a gradual reduction in transmitted power of the pulsed laser $LSR_{FLS}$ passing through the optical window 100z, which leads to instability of the ignition.

It has been found that in the comparative example 1, even if the optical window 10z is offset outwardly from the center of the base end of the prechamber 152z, the tumble flows will occur which travel vertically in the prechamber 152z, so that the axially-oriented centrifugal force $F_{TMB}$ acts on the oil mist, thus not avoiding the attachment of the oil mist to the optical window 100z.

Figure 4:
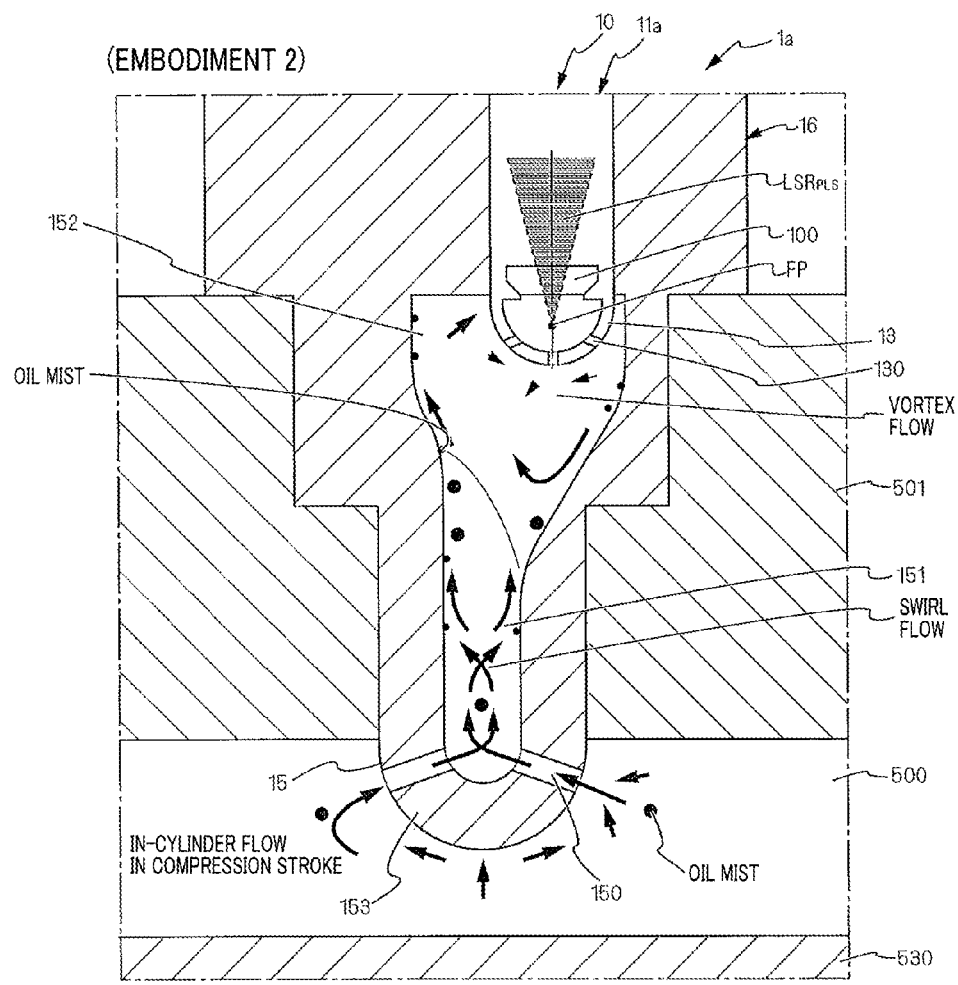
FIG. 4 is a vertical sectional view which schematically illustrates a laser ignition device 1 in the second embodiment of the invention.

The laser ignition device 1a of the second embodiment will be described below with reference to FIG. 4.

In this embodiment, the structure of the laser ignition device 1a is identical with that of the laser ignition device 1 of the first embodiment from which the protective plate 12 is omitted. The housing 11a has the cover body 13a with spray holes disposed on the front end thereof. Other arrangements are identical with those in the first embodiment.

In this embodiment, the centrifugal force $F_{CNT}$ which is produced by swirl flows created by the prechamber spray holes 150 and oriented in the horizontal direction is exerted on the oil mist. The oil mist is decreased in flow velocity due to a difference in inner diameter between the prechamber throat portion 151 and the prechamber 152 which are arranged eccentrically from each other and prevented from entering the prechamber. The cover body 13 serves to minimize the attachment of the oil mist to the optical window 100.

The omission of the protective plate 12 results in attachment of a small amount of oil mist having entered the cover body 13 to the surface of the optical window 100, which may lead to a decreased time until the optical window 100 needs to be cleaned with long-term use.

The omission of the protective plate 12 results in a decrease in production cost. It is, therefore, possible to select one of the laser ignition device 1 and the laser ignition device 1a in terms of a balance between a required degree of the durability and the cost. The cover body 13 serves to create a flow of the air-fuel mixture oriented to the focal point FP within the cover body 13 and also reduce the flow velocity of the air-fuel mixture entering the cover body 13, thereby resulting in decreased effects of cooling the flame, which enhances the rate at which the flame grows.

Figure 5:
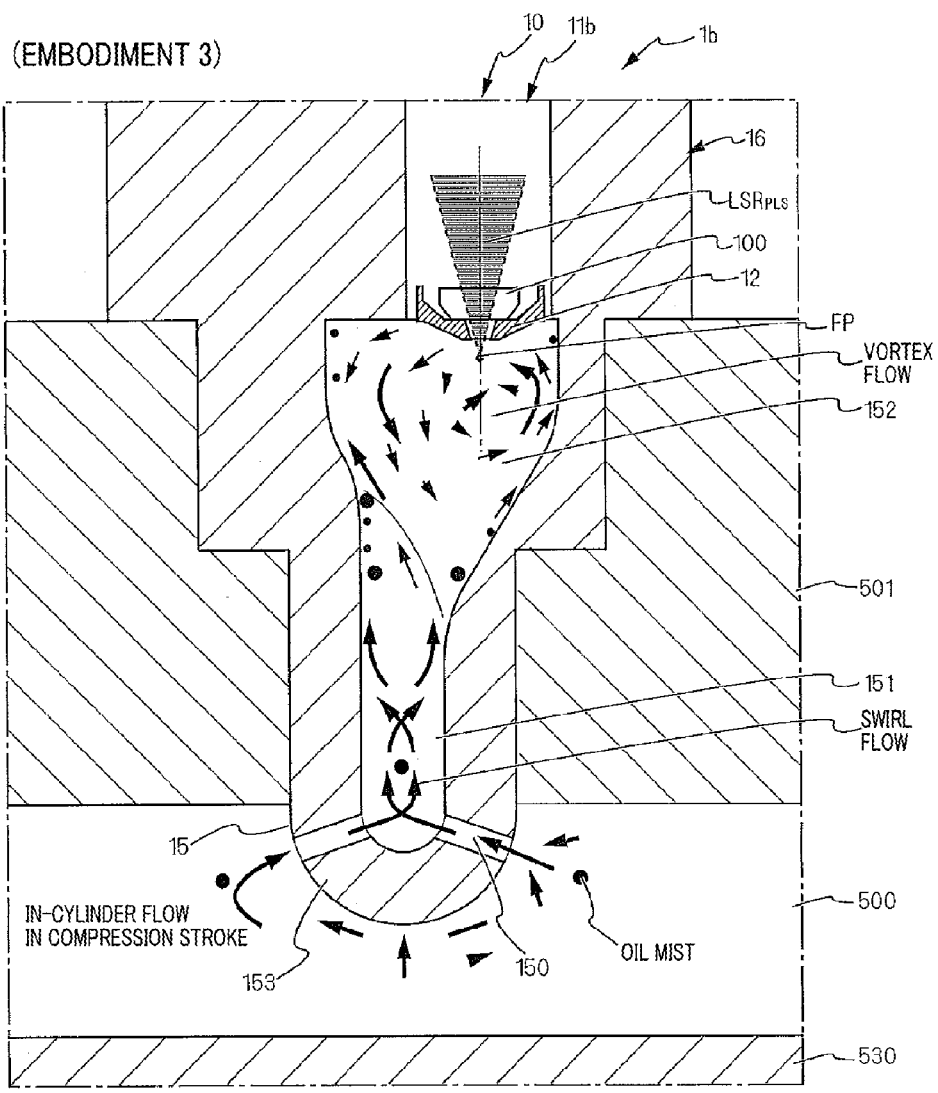
FIG. 5 is a vertical sectional view which schematically illustrates a laser ignition device 1b in the third embodiment of the invention.

The laser ignition device 1b of the third embodiment of the invention will be described below with reference to FIG. 5.

The structure of the laser ignition device 1b of this embodiment is identical with that of the laser ignition device 1 from which the cover body 13 is omitted. The housing 11b has protective plate 12 retained in the front end thereof.

Like in the above embodiment, the centrifugal force $F_{CNT}$ which is produced by swirl flows created by the prechamber spray holes 150 and oriented in the horizontal direction is exerted on the oil mist. The oil mist is decreased in flow velocity due to a difference in inner diameter between the prechamber throat portion 151 and the prechamber 152 which are arranged eccentrically from each other and thus prevented from entering the laser-passing hole 121 of the protective plate 12 to minimize the attachment of the oil mist to the optical window 100. It has been found that in the absence of the protective plate 12, the center of a vortex flow occurring in the prechamber 152 is located closer to the front end than the converging point FP is, but however, the presence of the protective plate 12 results in close coincidence of the center of the vortex flow with the converging point FP. This enables the ignition of the air-fuel mixture to be achieved in a region where the density of the air-fuel mixture is relatively high, and the flow velocity thereof is relatively slow, thus resulting in a decrease in cooling loss of the flame and an enhanced rate at which the flame growths.

Figure 6:
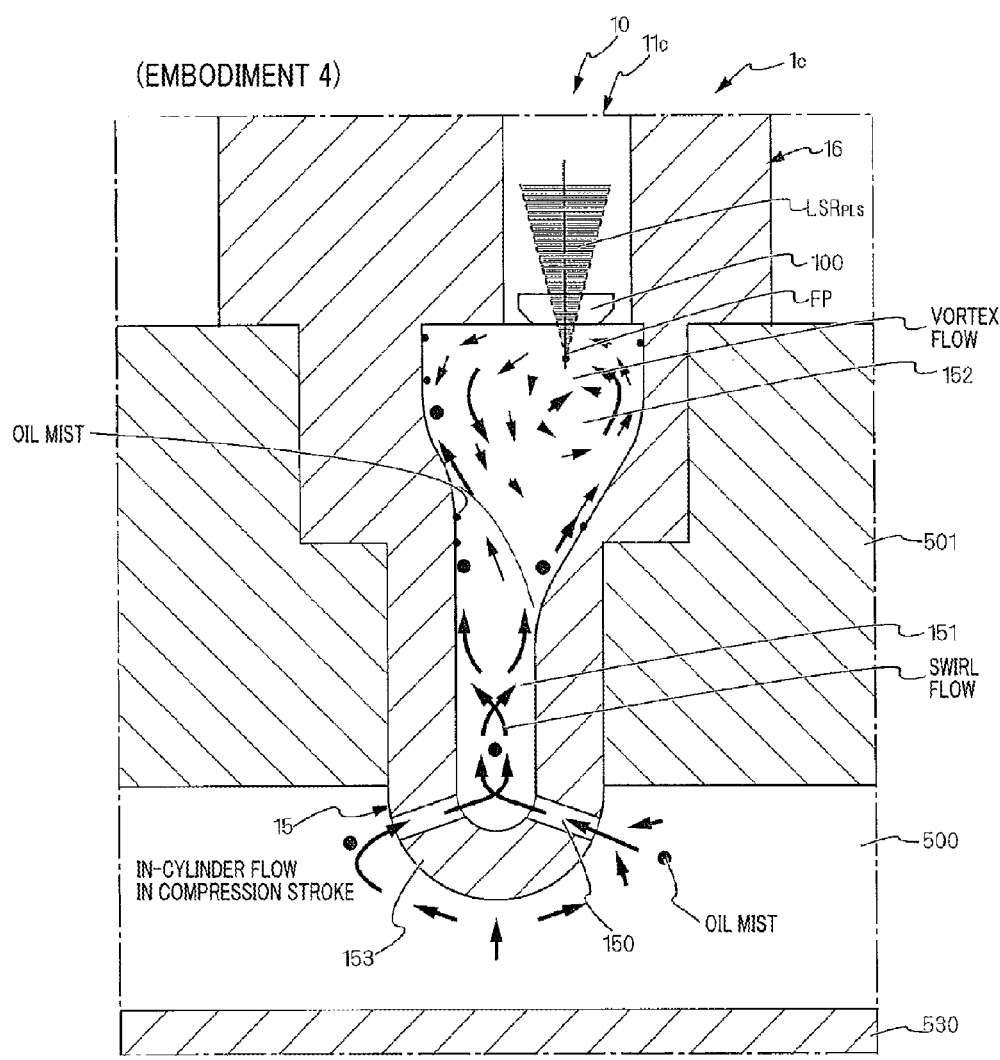
FIG. 6 is a vertical sectional view which schematically illustrates a laser ignition device 1c in the fourth embodiment of the invention.

The laser ignition device 1c of the fourth embodiment of the invention will be described below with reference to FIG. 6.

The structure of the laser ignition device 1c of this embodiment is identical with that of the laser ignition device 1 from which the protective plate 12 and the cover body 13 are omitted. The housing 11c has the optical window 100c which is retained in the front end thereof and exposed to the prechamber 152c.

It has been found that like in the above embodiment, the swirl flows created by the prechamber spray holes 150 in the prechamber cap 15 serve to attach the oil mist to the wall surface of the prechamber throat portion 151 and the inner wall of the prechamber 152, thus resulting in a greater decrease in amount of the oil mist adhered to the optical window 100 as compared with the comparative example. 1.

Figure 7A:
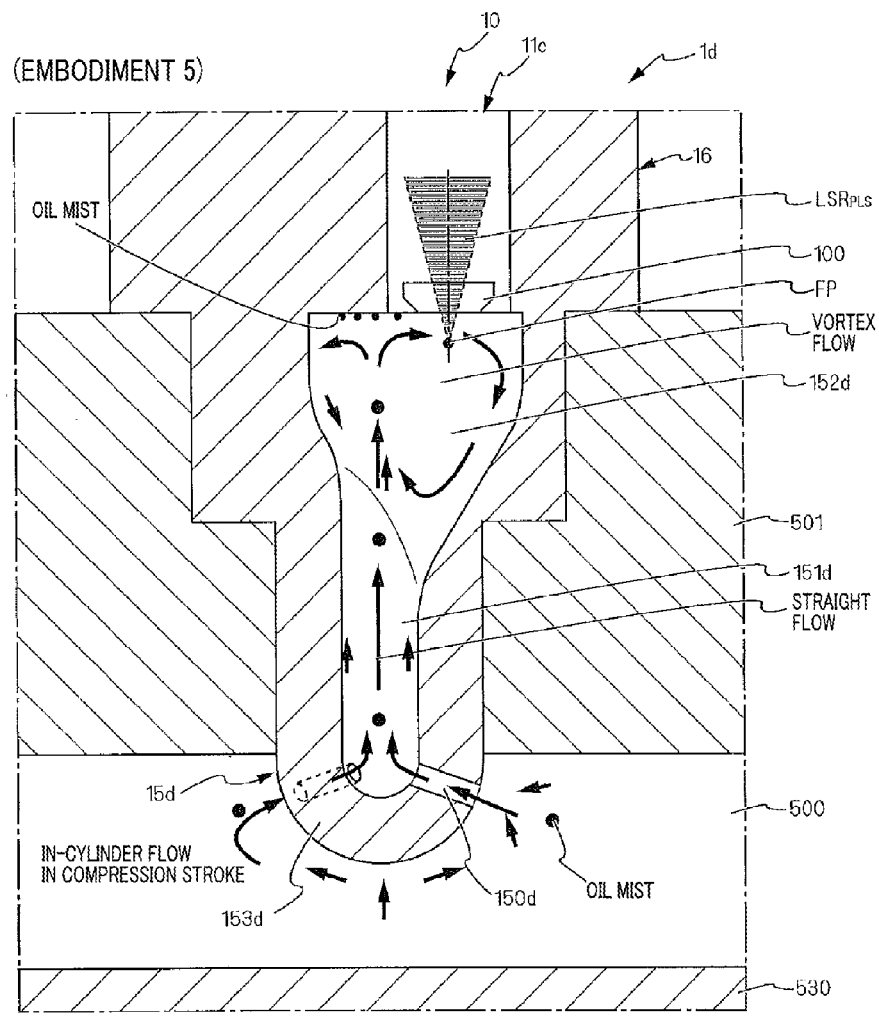
FIG. 7A is a vertical sectional view which schematically illustrates a laser ignition device 1d in the fifth embodiment of the invention.
Figure 7B:
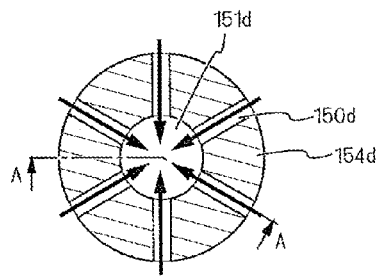
FIG. 7B is a transverse sectional view which schematically illustrates a top of a cap of the laser ignition device 1d of FIG. 6A.

The brief overview of the laser ignition device 1d of the fifth embodiment of the invention will be referred to below with reference to FIGS. 7A and 7B.

The structure of the laser ignition device 1d is identical with that of the laser ignition device 1 from which the protective plate 12 and the cover body 13 are omitted, and the prechamber cap 15d, like in the above embodiment, has the prechamber 15 and the prechamber throat portion 151d arranged eccentrically from each other, but different therefrom in that the prechamber spray holes 150d are drilled and collectively oriented toward the center of the prechamber throat portion 151d.

This embodiment shows minimum arrangements required to realize the present invention.

In this embodiment, gas flows, as having passed through the prechamber spray holes 150d, will be straight flows in the prechamber throat portion 151d in the compression stroke. When entering the prechamber 152 formed on the base end side, the gas flows are subjected to a drop in flow velocity and create vortex flows oriented outwardly from the center of the prechamber 152d.

The following beneficial advantages of the invention have been found to be offered. The oil mist carried by the straight flows continues to travel straight due to inertial thereof and then adheres to the upper surface of the prechamber 152d. The prechamber 152d is oriented eccentrically from the prechamber throat portion 151d. The optical window 100c of the laser spark plug 10 is also arranged on or outwardly eccentrically from the center axis $AX_F$ of the prechamber 152d. This results in a decrease in amount of oil mist directly attached to the optical window 100c as compared with the comparative example. 1.

The particle size of the oil mist reaching the optical window 100 is found to be smaller than that in the comparative example.

Figure 8:
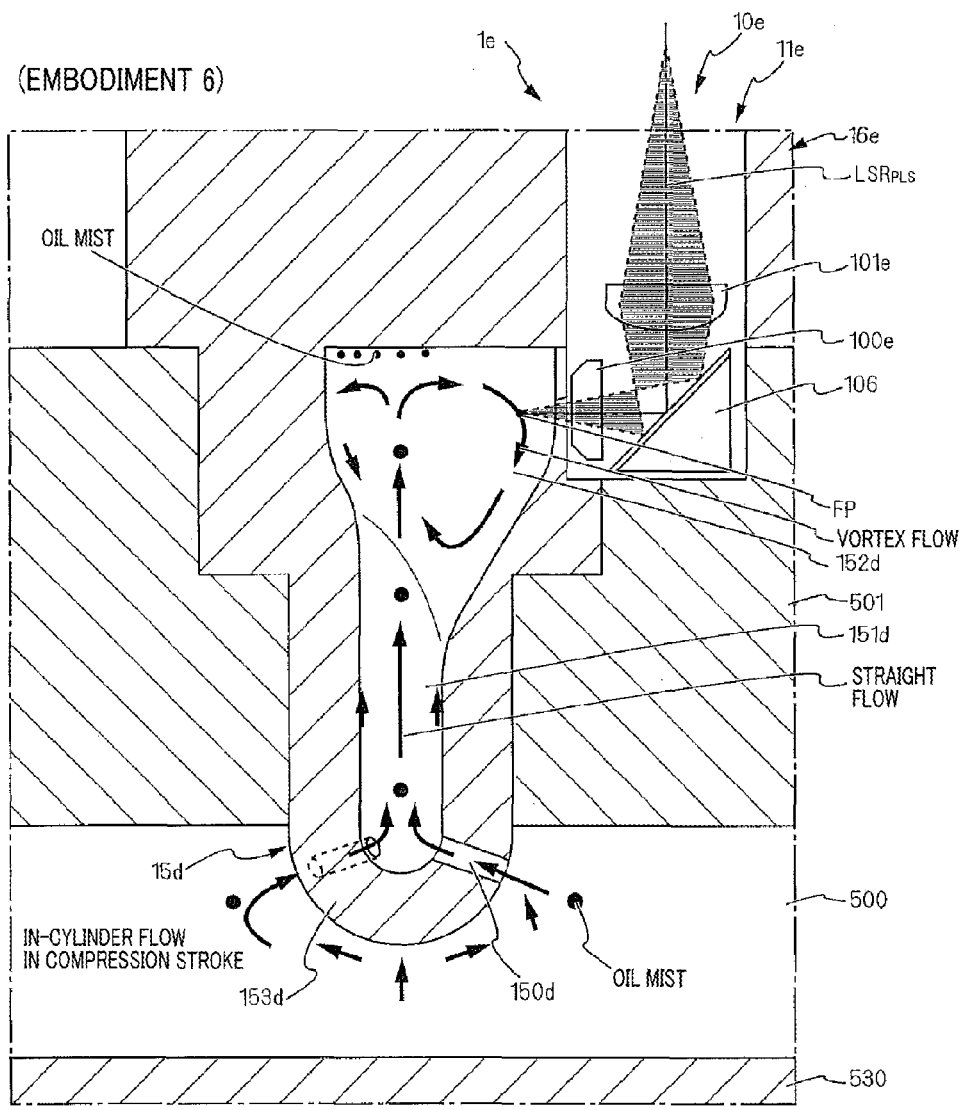
FIG. 8 is a vertical sectional view which schematically illustrates a laser ignition device 1e in the sixth embodiment of the invention.

The brief overview of the laser ignition device 1e of the sixth embodiment will be described below with reference to FIG. 8.

This embodiment is identical with the laser ignition device 1d in that the prechamber spray holes 150d are drilled in the front end of the prechamber cap 15d and oriented to the center of the prechamber cap 15d, and the prechamber 152d is arranged eccentrically from the prechamber throat portion 151d, but different therefrom in the laser spark plug 10e designed to emit the pulsed laser $LSR_{PLS}$ from the outer peripheral wall of the prechamber 152d in a direction perpendicular to the center axis of the prechamber cap 15d without outputting the pulsed laser $LSR_{PLS}$, like in the above embodiment, from the laser spark plug 10 in the axial direction thereof.

This embodiment shows an example where the pulsed laser $LSR_{PLS}$ and the prechamber cap 15d are oriented to have axes extending perpendicular to each other, but the present invention is not limited to an angle at which the pulsed laser $LSR_{PLS}$ enters the prechamber 152d.

It is preferable that the prechamber spray holes 150d are collectively drilled to have center axes intersecting with the center axis of the prechamber throat portion, the optical window 100d is arranged outside the inner peripheral wall of the prechamber 152d so as to have the center axis $AX_L$ intersecting with the center axis $AX_F$ of the prechamber 152d so that the pulsed laser $LSR_{PLS}$ is inputted into the prechamber 152d from a side surface thereof.

The laser spark plug 10e has the reflective mirror 106 disposed in the laser spark plug 10 used in the above embodiment to refract the optical axis of the pulsed laser $LSR_{PLS}$.

In this embodiment, the adhesion of the oil mist to the upper surface of the prechamber 152d is accomplished using flows moving straight in the prechamber throat portion 151d, thereby avoiding the attachment of the oil mist to the optical window 100e disposed on the side of the prechamber 152d.

This embodiment is also capable of greatly reducing the attachment of the oil mist as compared with the comparative example 1.

A combination of the protective plate 12 and the cover body 13 may be arranged to cover the optical window 100e of the laser ignition device 1e of this embodiment.

Figure 9:
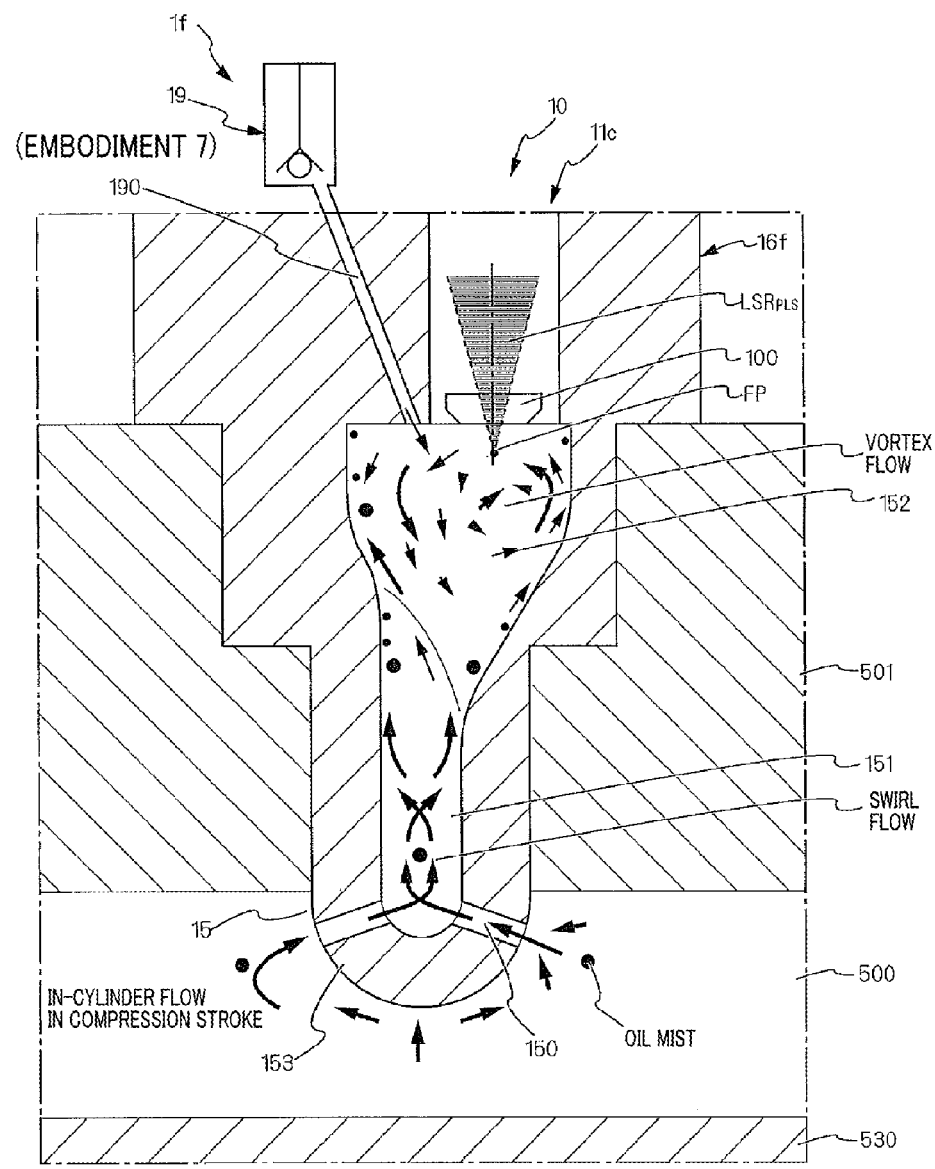
FIG. 9 is a vertical sectional view which schematically illustrates a laser ignition device if in the seventh embodiment of the invention.

The laser ignition device if in the seventh embodiment of the invention will be described below with reference to FIG. 9.

This embodiment is not confined to a fuel supply system for the combustion chamber 500 of the internal combustion engine 5, but may employ known fuel injection systems in which fuel is supplied into the intake cylinder or directly into the combustion chamber. This embodiment is also different in structure from the above embodiment in that the auxiliary fuel injection valve 19 is provided to additionally deliver fuel into the prechamber 152 through the auxiliary fuel flow path 190 formed in the holder 16f when it is determined that the ignitability of the air-fuel mixture conducted from a main fuel injection valve into the combustion chamber 500 is intrinsically low, thus resulting in a difficulty in ensuring stability of the ignition.

The auxiliary fuel injection valve 19 and the auxiliary fuel flow path 190 may be used in any of the above embodiments.

This embodiment, like the above embodiments, serves to avoid the contamination of the optical window 100 for achieving the stability of ignition for a long period of time and facilitate the ease of the ignition with the aid of the supply of auxiliary fuel.

In the case where the laser ignition device 1 of this invention is used with an external combustion engine, the beneficial advantages are provided by delivering the air-fuel mixture into the prechamber 152 using the pressure of injection of the fuel or with the aid of the auxiliary fuel injection valve 19.

In the external combustion engine using gas fuel, lubricating oil never spreads in the combustion chamber, so that there is no need for considering the adhesion of the oil to the optical window 100 of the laser ignition device 1.

However, when the air-fuel mixture is ignited in the prechamber 152, the swirl flows, as developed by the prechamber spray holes 150, are used to improve the rate at which flame growths, an initial flame is produced inside the cover body 13 to ensure the stability of the ignition of the air-fuel mixture, or the protective plate 12 is provided to improve the rate at which the air-fuel mixture is combusted as well as protecting the optical window 100. The use of the laser ignition device 1 of this invention with the external combustion engine, therefore, offers the many beneficial effects.

Tests and results of the tests which the inventors of this application performed to confirm the beneficial effects of the invention will be described below with reference to FIGS. 10, 11A, 11B, 11C, 12, and table 1.

Flow analysis which was performed on some embodiments and comparative examples shows that in the comparative example 1, in-cylinder gas flows which are produced at low flow velocities (e.g., 2 m/s or less) in the combustion chamber 500 during the compression stroke are accelerated (up to 50 m/s) when traveling in the prechamber spray holes 150z, move straight in the prechamber throat portion 151z at high speeds (e.g., a maximum of 50 m/s at the center, and 30 m/s near the inner periphery of the prechamber throat portion 151z), and then are subjected to a drop in flow velocity (e.g., to 2 m/s to 10 m/s) in the prechamber 152z, so that some of the gas flows around the center of the prechamber 152z move straight, while peripheral some of the gas flows spread along the inner peripheral wall of the prechamber 152z.

It has been, however, found that in the comparative example 1, even if the optical window 100z is disposed eccentrically from the center axis of the prechamber 152z on the base end side thereof, the gas flows impact at relatively high velocity (e.g., 5 m/s) directly on the optical window 100z.

It has also been found that in the embodiment 5 where the prechamber cap 15d is used, in-cylinder gas flows which are produced at low flow velocities (e.g., 2 m/s or less) in the combustion chamber 500 during the compression stroke are, like in the comparative example 1, accelerated (up to 50 m/s) when traveling in the prechamber spray holes 150z, move straight in the prechamber throat portion 151d at high speeds (e.g., a maximum of 50 m/s at the center, and 30 m/s near the inner periphery of the prechamber throat portion 151d), and then are subjected to a drop in flow velocity (e.g., to 2 m/s to 10 m/s) in the prechamber 152 arranged eccentrically from the prechamber throat portion 151d, so that vortex flows are created in the prechamber 152, and portions of them move substantially parallel to the optical window 100.

It has also been found that in the embodiment 3, the use of the prechamber cap 15 causes in-cylinder gas flows which are produced at low flow velocities (e.g., 2 m/s or less) in the combustion chamber 500 during the compression stroke to be accelerated (to up to 50 m/s) when traveling in the prechamber spray holes 150 and also changed into swirl flows which rotate in the circumferential direction when entering the prechamber throat portion 151 and then move at higher velocities near the inner peripheral wall and at lower velocity around the center of the prechamber throat portion 151. It has also been found that when the swirl flows are discharged from the prechamber throat portion 151 into the prechamber 152, vortex flows are produced at low velocities (e.g., 5 m/s or less).

It has been found that in the embodiment 2, vortex flow are created in the cover body 13 at very low velocities (e.g., 2 m/s or less), but they move inside and outside the cover body 13, and the air-fuel mixture is conducted into the cover body 13.

Figure 10:
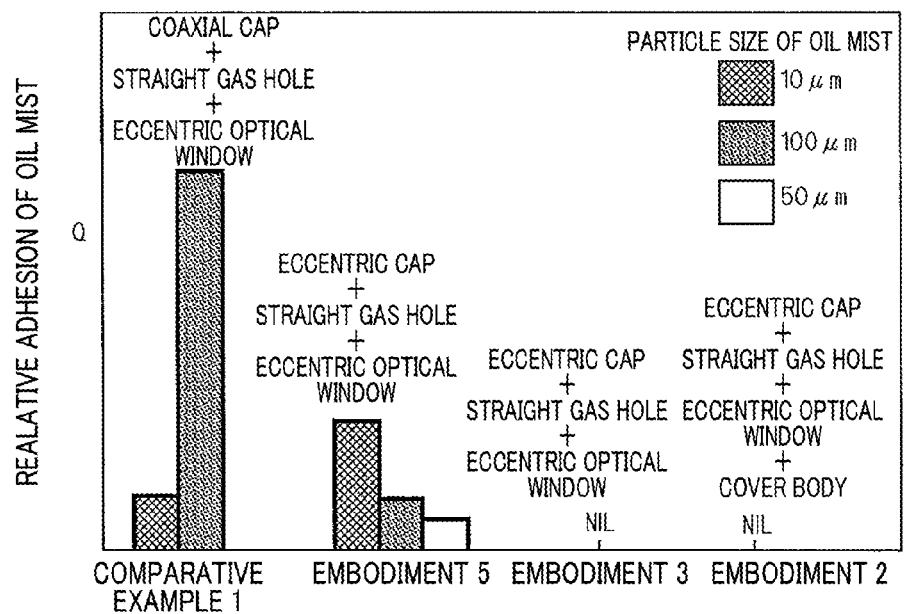
FIG. 10 is a characteristic view which represents results of tests performed to check contamination avoidance effects offered by the present invention along with a comparative example.

The table 1 and FIG. 10 represent results of the flow analysis executed on the comparative example 1 and the embodiments 2, 3, and 5 about the amount of oil mist attached to the optical window 100. Specifically, droplets of oil mist whose particle sizes are 10 μm, 50 μm, and 100 μm were delivered from the combustion chamber 500. When the droplets of oil mist hit on wall surfaces of parts of the laser ignition devices, it was determined that the oil mist was adhered thereto. A total amount of the adhered oil mist was calculated and expressed by a relative value where a total amount of the adhered oil mist in the comparative example 1 is defined as 100.

As apparent from FIG. 10 and table 1, in the embodiment 5 of the invention, a distribution of particle size of the oil mist attached to the optical window 100 is small. The amount of the adhered oil mist is decreased by half as compared with the comparative example 1.

Further, it has been found that in the embodiments 2 and 3 of the invention, the amount of the adhered oil mist is reduced below a detectable limit.

TABLE 1

| | Conditions | | | Relative adhesion of oil mist | | | |
|---|---|---|---|---|---|---|---|
| sample | Prechamber cap | Gas path | Cover body | 10 μm | 50 μm | 100 μm | Total |
| Comparative Example 1 | Coaxial cap 15x | Straight gas path 150z | Absent | 12 | 0 | 88 | 100 |
| 1st embodiment | Eccentric cap 15 | Spiral gas path 150 | Present | NIL (lower than detection limit) | | | |
| 2nd embodiment | Eccentric cap 15 | Spiral gas path 150 | Present | NIL (lower than detection limit) | | | |
| 3rd embodiment | Eccentric cap 15d | Straight gas path 150d | Absent | 30 | 8 | 12 | 50 |

Figure 11A:
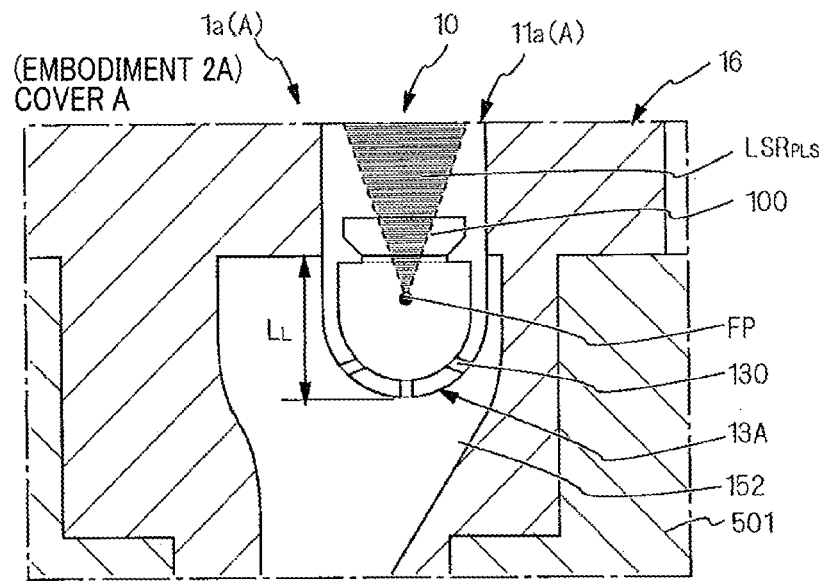
FIG. 11A is a sectional view of a major portion of a laser ignition device 1a(A) shown as an embodiment 2 used for checking beneficial effects of the laser ignition device 1b in the second embodiment of the invention.
Figure 11B:
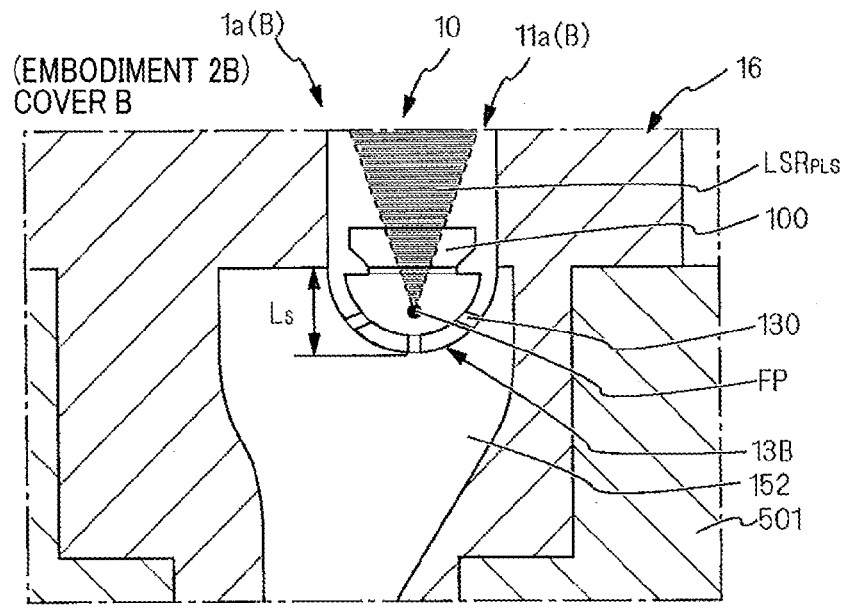
FIG. 11B is a sectional view of a major portion of a laser ignition device 1b(B) shown as a modification.
Figure 11C:
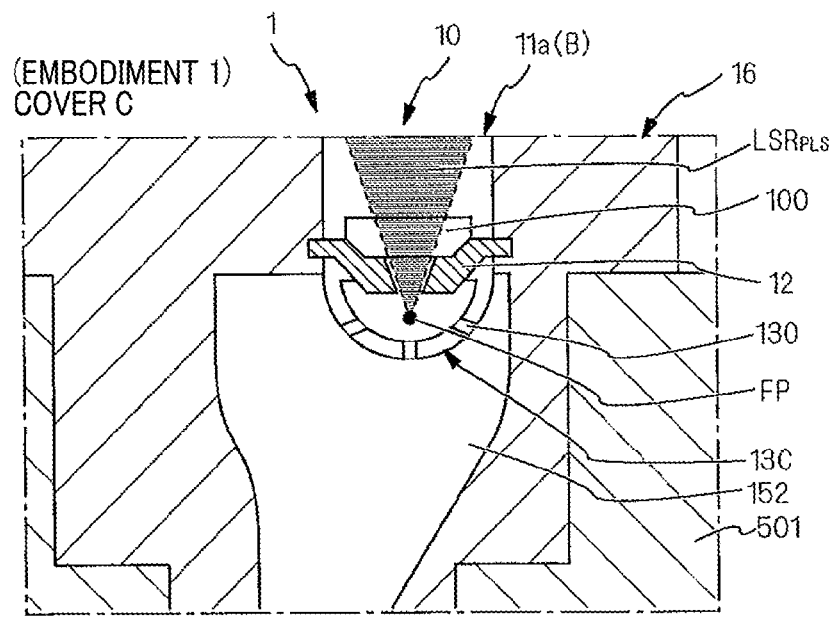
FIG. 11C is a sectional view of a major portion of a laser ignition device in the first embodiment of the invention.

FIGS. 11A, 11B, and 11C show outlines of specimens prepared to confirm beneficial effects of improvement of the ignition.

Figure 12:
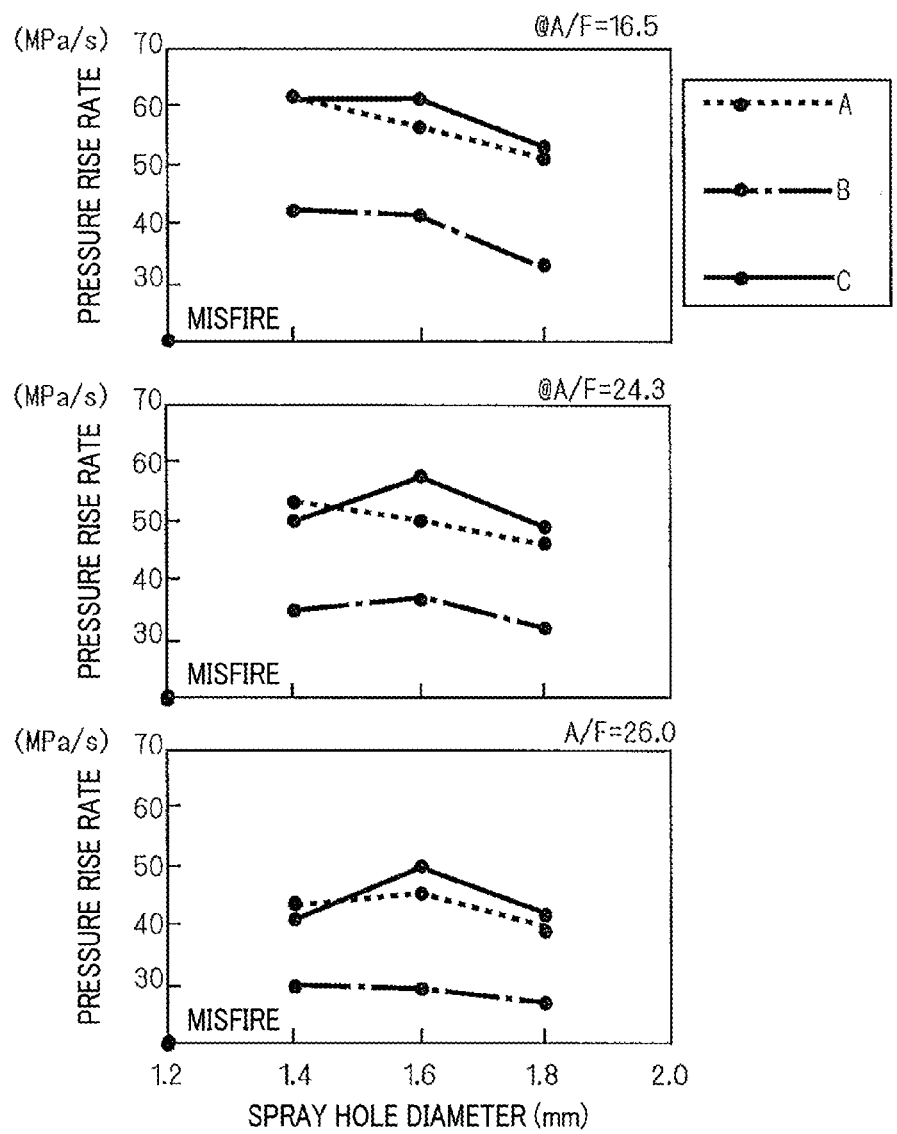
FIG. 12 is a characteristic view which represents results of tests performed to check beneficial effects on improvement of ignitabilty in the invention and also indicates relations among an air-fuel ratio, shape of a cover (i.e., a length of the cover and diameter of cover spray holes, a rate of an elevation of pressure.

FIG. 12 represents results of investigation for beneficial effects, as offered by the cover body 13 and the protective plate 12, using the specimens shown in FIGS. 11A, 11B, and 11C.

Combustion tests were performed using a pressure vessel simulating an internal combustion engine. Specifically, ignition tests were executed by delivering gas at a given air-fuel ratio to the pressure vessel and focusing a selected energy quantity of a laser pulse on the gas.

The structure labeled as a cover A in FIG. 11A is a laser ignition device 1a(A) in which a length $L_L$ of the cover body 13 protruding into the prechamber 152 is increased (e.g., to 15.5 mm) as compared with the laser ignition device 1a of the second embodiment. The structure labeled as a cover B in FIG. 12B is a laser ignition device 1a(B) in which a length $L_S$ of the cover body 13 protruding into the prechamber 152 is increased (e.g., to 10 mm) as compared with the laser ignition device 1b of the second embodiment. The structure labeled as a cover B in FIG. 12C includes both the protective plate 12 and the cover body 13 of the laser ignition device 1 in the first embodiment of the invention.

FIG. 12 represents results of the combustion tests performed on three types of samples in which the diameter of the cover spray holes 130 is 1.4 mm, 1.6 mm, and 1.8 mm, respectively, in the structure of each embodiment when the air-fuel ratio is selected to be 17.4, 24.3, and 26.

The results of the combustion tests show that the laser ignition device 1 of the first embodiment (i.e., the cover C with protective cover 12 in which the diameter of the cover spray holes 130 is 1.6 mm) serves to provide a higher maximum cylinder pressure and the shortest time required to reach the maximum cylinder pressure, thereby resulting in an increased combustion rate in a lean burn mode.

It has been also found that the protective plate 12 is expected to offer beneficial effects not only to reduce a risk that the oil mist is adhered to the optical window 100 to avoid contamination of the optical window 100, but also to improve the combustion rate.

The reached cylinder pressure and a rise in cylinder pressure in the case (i.e., the cover A) wherein the protruding length of the cover body 13 is longer is greater than those in the case (i.e., the cover B) wherein the protruding length of the cover body 13 is shorter. This may be because an amount of air-fuel mixture delivered into the cover body 13 in the cover A is greater than that in the cover B, thus resulting in improved rate of the combustion. It has also been found that an increase in the protruding length of the cover body 13 results in improvement of the ignitability, however, this may cause the cover body 13 to glow when subjected to combustion heat to lead to preignition or result in a deterioration of durability of the cover body 13.

The structure of the protective plate 12 and modifications 12a, 12b, 12c, and 12d thereof will also be described in detail with reference to FIGS. 13A, 13B, 14A, 14B, 15A, 15B, 16A, and 16B.

Figure 13A:
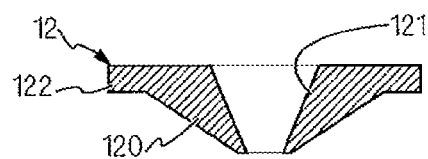
FIG. 13A is a sectional view which schematically illustrates a protective plate 12 used in a laser ignition device 1c in the first and fourth embodiments of the invention.
Figure 13B:
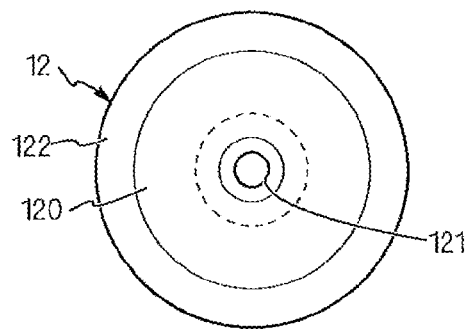
FIG. 13B is a bottom view of FIG. 13A.

The protective plate 12, as illustrated in FIGS. 13A and 13B, has a basic structure required by the invention.

The outer periphery of the plate base portion 120 is of a frusto-conical shape which has a diameter decreasing toward the tip thereof. This is because the tapered external shape of the plate base portion 120 serves to decrease a thermal capacity thereof to reduce a risk of quenching flames or avoid preignition arising from exposure to heat of flames. The frusto-conical tapered surface of the plate base portion 120 whose diameter decreases toward the combustion chamber works to shape a flow of air-fuel mixture moving around it into a flow oriented to the combustion chamber, thereby further reducing a risk of adhesion of the oil mist to the optical window 100.

The plate base portion 120 has formed in the center thereof the laser-passing hole 121 which opens not to block the optical path through which the laser pulse $LSR_{PLS}$ passes. The laser-passing hole 121 is of a mortar shape in which a base side opening has a greater diameter, while a front side opening has a smaller diameter.

The decrease in diameter of the front end of the laser-passing hole 121 results in a reduced risk that the oil mist enters the laser-passing hole 121. The angle of inclination of the laser-passing hole 121 may be changed depending upon an angle at which the laser pulse $LSR_{PLS}$ is collected.

In this embodiment, the protective plate 12 has the plate retaining portion 122 shaped in the form of a flange on the base end side thereof. The plate retaining portion 122 is pressed by the above described seal member 14 so that it is retained to be removable to the front end side of the laser spark plug 10. This embodiment exemplifies the protective plate 12 as having the frusto-conical outer periphery whose diameter decreases linearly, however, the protective plate 12 may alternatively be formed in a circular shape which is inwardly recessed in order to further decrease the thermal capacity thereof. In this case, flows oriented in the axial direction around the protective plate 12 are shaped along the curved surface and directed to the front end side, thereby further reducing the risk of adhesion of oil mist to the optical window 100.

Figure 14A:
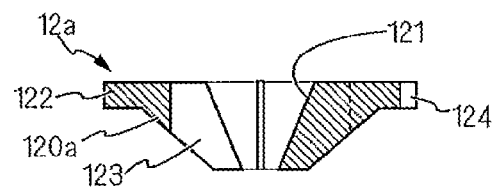
FIG. 14A is a sectional view which illustrates a modification 12a of a protective plate.
Figure 14B:
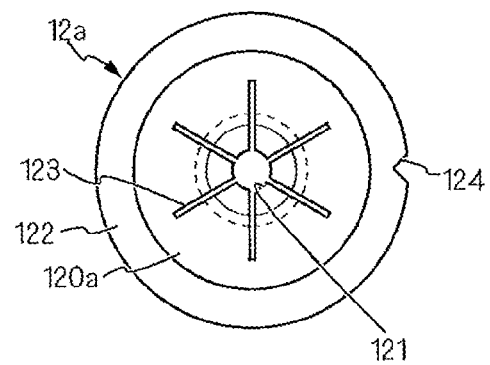
FIG. 14B is a bottom view of FIG. 14A.

In the modification 12a illustrated in FIGS. 14A and 14B, the plate base portion 120a has at least one groove 123 which is made in the form of a slit by cutting a portion of a surface thereof extending from the optical window side to the prechamber side.

The groove 123 is designed to have a width of about 0.5 mm to 2 mm in order to exhibit capillary action to adsorb the oil mist. Specifically, the groove 123 works to adsorb the oil mist attached to the surface of the optical window 100 by means of the capillary action, thereby minimizing a risk of formation of deposits on the surface of the optical window 100, which leads to enhanced durability of the laser ignition device 1. The oil mist adsorbed in the groove 123 has contained therein metal which usually becomes oxidized during combustion of the fuel and then is attached as metallic oxide to the groove 123. The metallic oxide is, however, blown away by blast generated by the combustion and eventually discharged outside the combustion chamber together with the exhaust gas. Too small a width of the groove 123 results in an increased risk that the metallic oxide is caught in the groove 123 and difficult to remove. It is, thus, preferable that the width of the groove 123 is selected to fall in the above range.

The plate retaining portion 122 is equipped with a positioning means 124 in the form of a cut-out groove or a pin hole in order to orient the protective plate 12a in a selected direction upon installation thereof in a case where the groove 123 is drilled in the selected direction. The modification 12a is exemplified as having a plurality of grooves 123 which are radially arranged at equal intervals away from each, but however, is not limited to such a structure. The grooves 123 may alternatively be collected in a given direction to use a gas flow moving along the surface of the protective plate 12a for discharging the oil mist.

Figure 15A:
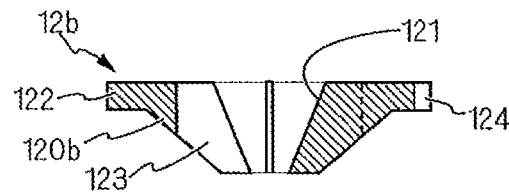
FIG. 15A is a sectional view which illustrates a modification 12b of a protective plate.
Figure 15B:
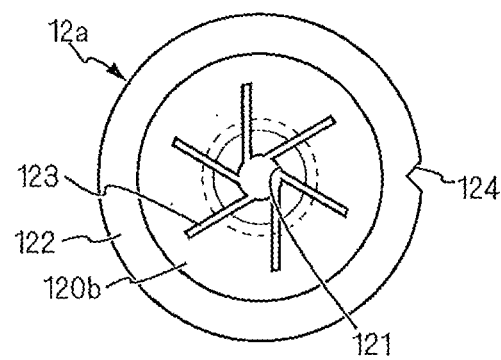
FIG. 15B is a bottom view of FIG. 15A.

The modification 12b illustrated in FIGS. 15A and 15B is different from the above structures in that the grooves 123 extend in misalignment from the center of the protective plate 12b. When a flow of oil mist enters the protective plate 12b in the compression stroke, such a gas flow passes through the grooves 123 and is shaped thereby to create swirl flows within the laser-passing hole 121 which facilitate the ease with which the oil mist adheres to the inner wall of the protective plate 12b. However, when an initial flame is generated by irradiation of the pulsed laser $LSR_{PLS}$, portions of the expanding flame pass through the grooves 123 and then are shaped thereby to create swirl flows which are expected to induce mixing of the flame kernel and the air-fuel mixture to enhance the rate of growth of the flame. Further, when passing the grooves 123, the portions of the flame serve to remove metallic oxides attached to the wall of the slit and the inner wall of the protective plate 12b, thereby keeping the protective plate 12b clean over a long period of time.

Figure 16A:
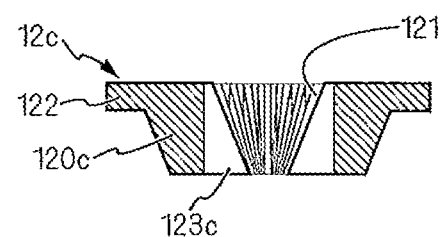
FIG. 16A is a sectional view which illustrates a modification 12c of a protective plate.
Figure 16B:
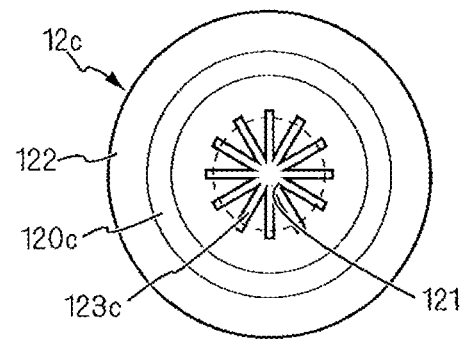
FIG. 16B is a bottom view of FIG. 16A.

The modification 12c illustrated in FIGS. 16A and 16B has lots of grooves 123 drilled to increase a surface area thereof to enhance the adsorption of oil mist. The protective plate 12 is not limited to the above embodiments, but may be modified in various ways.

The positional relation among the prechamber throat portion 151, the prechamber 152, and the cover body 13 which are essential parts of the invention and their modifications will be described below with reference to FIGS. 17A and 17B.

Figure 17A:
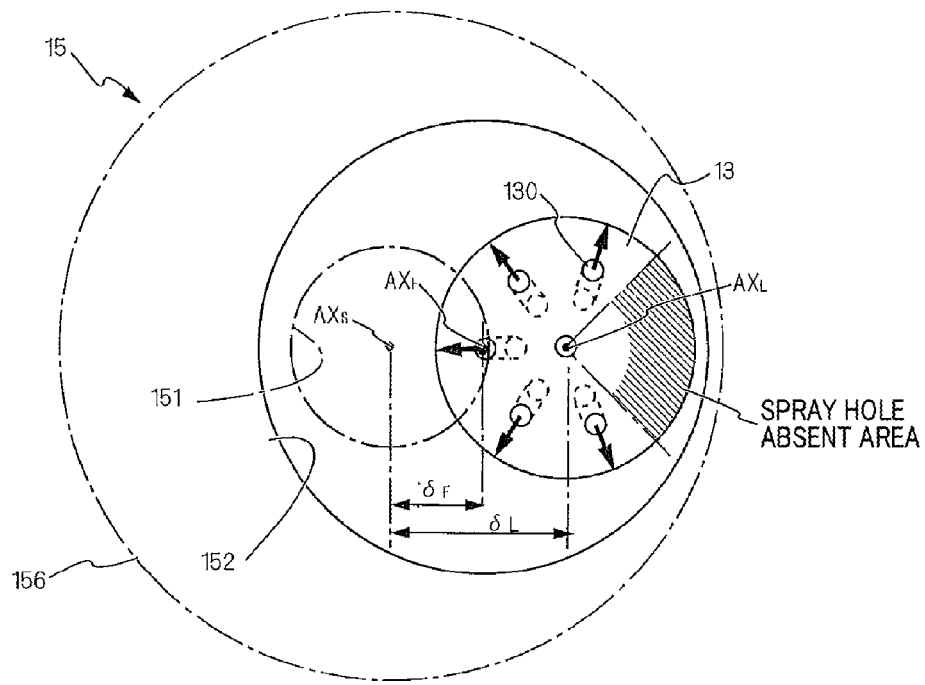
FIG. 17A is a major pat bottom view which illustrates a positional relation between a prechamber cap 15 that is a major part of the invention and a cover body 13 and also illustrates a location of cover spray holes 130 of the cover body.
Figure 17B:
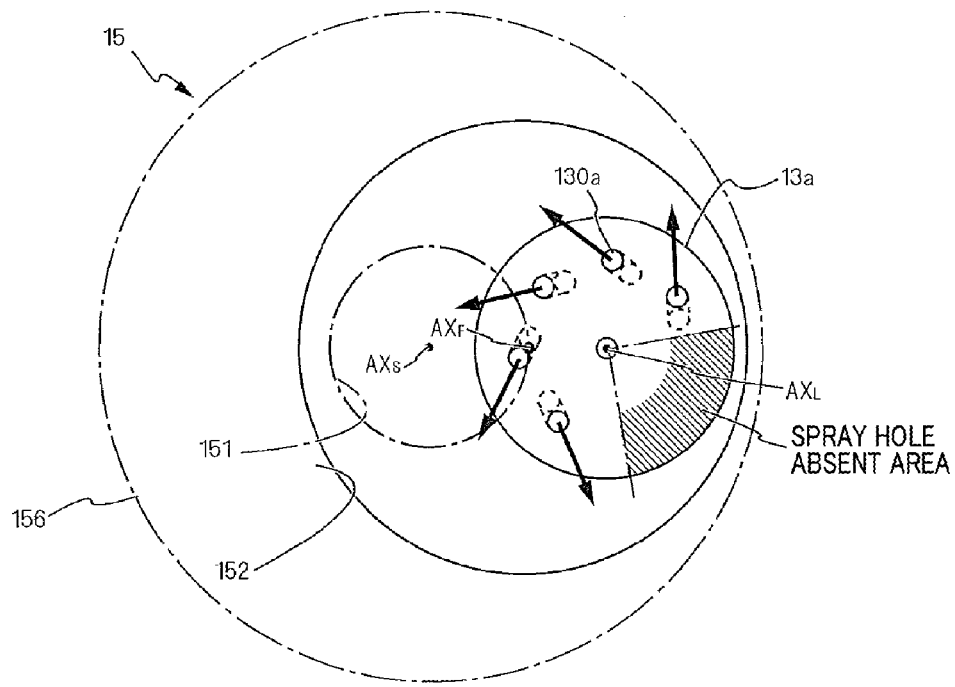
FIG. 17B is a major part bottom view which illustrates a modification 130a of a gas path.

The prechamber 152 is, as illustrated in FIG. 17A, disposed to have the center axis $AX_F$ oriented eccentrically from the center axis $AX_S$ of the prechamber throat portion 151 toward the side thereof. The center axis $AX_L$ of the cover body 13 is arranged coaxially with or eccentrically from the center axis $AX_F$ of the prechamber 152 toward an outer periphery thereof. In other words, the distance $\delta_F$ between the center axis $AX_S$ of the prechamber throat portion 151 and the center axis $AX_F$ of the prechamber 152 and the distance 6L between the center axis $AX_S$ of the prechamber throat portion 151 and the center axis $AX_L$ of the cover body 13 bear a relation of $\delta_F \leq \delta_L$. In the above described embodiments, the tests were performed on examples where the distance 6F is 3 mm, and the center axis $AX_F$ of the prechamber 152 coincides with the center axis $AX_L$ of the cover body 13.

In this embodiment, the cover body 13 has cover spray holes 130 one of which is drilled at the center of the cover body 13 and extends in the axial direction of the cover body 13 and remaining five of which are arranged at equal intervals away from each other and oriented toward the center of the cover body 13. It is, however, advisable that a given area of the cover body 13 be provided as a spray hole-absent area where there is no cover spray holes 130.

The reason why the cover body 13 has the spray-hole-absent area is that if the cover spray holes 130 are formed in the spray hole-absent area, as hatched in FIG. 17A, it will cause most flames, as jetted from locations of the cover spray holes 130, to directly impact on the inner peripheral wall of the prechamber 152, so that they are consumed in heating the wall surface of the prechamber cap 15, in other words, energy thereof is consumed uselessly without contributing to the growth of a flame in the air-fuel mixture. As illustrated as a modification in FIG. 17B, the cover body 13a has drilled therein a plurality of cover spray holes 130a which are oriented eccentrically from the center thereof. When the air-fuel mixture is ignited in the cover body 13a, so that combustion flames are jetted into the prechamber 152, the cover spray holes 130a work to create swirl flows of the flames in the prechamber 152. In this modification, it is advisable that the cover spray holes 130 not be formed in an area hatched in the FIG. 17B.

In the case where the pulsed laser $LSR_{PLS}$ are emitted, like in the above described laser ignition device 1e, from the side surface of the prechamber 152e, it is advisable that the spray hole-absent area be provided so as to divert jets of combustion flames from the base end side of the prechamber 152e in the axial direction without impacting on the closed base end surface of the prechamber 152e. The invention is not limited to the above embodiments and can be embodied in various ways without departing from the principle of the invention. For instance, in the above embodiments, the prechamber spray holes 150 are exemplified as being arranged at equal intervals away from each other in the circumferential direction, but the number of jets of flames may be changed between the intake side and the exhaust side of the combustion chamber 500 to eliminate a failure in combustion of the air-fuel mixture such as knocking in addition to the above beneficial advantages of the invention.

The invention claimed is:

1. A laser ignition device mounted in an engine which at least comprises:
    a laser spark plug which at least includes a condenser lens and an optical window, the condenser lens working to focus a pulsed laser emitted from a lasing device on a given converging point, the optical window being disposed between the condenser lens and the converging point and protecting the condenser lens from combustion heat and combustion pressure occurring in a combustion chamber of said engine; and
    a prechamber cap which is disposed between said optical window and said combustion chamber and includes a bottomed cylindrical prechamber which is defined to have a fixed volume, a prechamber throat portion which is smaller in sectional area than the prechamber, extends in an axial direction, and has an end fluidly communicating with said prechamber and has an end closed, and a plurality of prechamber spray holes which are drilled in the closed end of the prechamber throat portion and communicate with a combustion chamber of said engine,
    wherein the converging point is located inside the prechamber, an air-fuel mixture delivered into the prechamber is ignited, and combustion flames are jetted from the prechamber into the combustion chamber to fire said engine, and
    wherein a center axis of said prechamber is oriented eccentrically from a center axis of said prechamber throat portion in a horizontal direction.

2. A laser ignition device as set forth in claim 1, wherein center axes of said prechamber spray holes are inclined relative to the center axis of said prechamber throat portion in a fan-shape in a range of 100 to 170.

3. A laser ignition device, as set forth in claim 1, wherein the center axes of said plurality of prechamber spray holes are arranged at a twisted orientation eccentrically from the center axis of said prechamber throat portion, and wherein said optical window is arranged to have the center axis which is coaxial with the center axis of said prechamber or eccentrically from the center axis of said prechamber throat portion closer to an outer periphery than the center of said prechamber is on a base end side of said prechamber.

4. A laser ignition device, as set forth in claim 1, wherein said plurality of prechamber spray holes are collectively drilled to have the center axes traversing the center axis of said prechamber throat portion, and wherein said optical window is arranged outside an inner peripheral wall of the prechamber so as to have the center axis of said optical window intersecting with the center axis of said prechamber so that laser light is inputted into said prechamber from a side surface thereof.

5. A laser ignition device, as set forth in claim 4, wherein a protective plate is provided for said optical window on a side where said laser light travels, said protective plate having a laser-passing hole drilled without blocking an optical path of said laser light.

6. A laser ignition device, as set forth in claim 5, wherein said protective plate has an outer peripheral surface whose diameter decreases toward a tip thereof.

7. A laser ignition device, as set forth in claim 5, wherein a slit-like groove is provided which establishes communication between an optical window side surface of said protective plate which faces said optical window and a prechamber side surface of said protective plate which faces said prechamber.

8. A laser ignition device, as set forth in claim 1, wherein a cover body is arranged to cover said optical window and has a plurality of cover spray holes which are drilled and communicate between inside and outside the cover body.

9. A laser ignition device, as set forth in claim 8, wherein said plurality of cover spray holes are collectively drilled to have center axes intersecting with the center axis of said cover body.

10. A laser ignition device, as set forth in claim 8, wherein said plurality of cover spray holes are drilled to have center axes oriented eccentrically from the center axis of said cover body without intersecting therewith.

11. A laser ignition device, as set forth in claim 1, wherein gas fuel is used as fuel.

12. A laser ignition device, as set forth in claim 1, wherein an auxiliary fuel injection valve is provided to deliver auxiliary fuel to said engine, and wherein said prechamber cap has an auxiliary fuel flow path drilled to communicate between said auxiliary fuel injection valve and said prechamber.

* * * * *